United States Patent [19]

Barr et al.

[11] Patent Number: 5,182,705
[45] Date of Patent: Jan. 26, 1993

[54] COMPUTER SYSTEM AND METHOD FOR WORK MANAGEMENT

[75] Inventors: Robin Barr, Avon, Conn.; Linda Beauchesne, Santa Cruz, Calif.; Ronald Benson, Bristol, Conn.; Maureen Burdick, Burlington, Conn.; Joan Duffy, Simsbury, Conn.; Paul Fletcher, Hartford, Conn.; Denise Fritz, West Simsbury, Conn.; John R. Gaddas, West Hartford, Conn.; Joseph Girardini, Ellington, Conn.; Robert Guilmette, Bloomfield, Conn.; David Hughes, Plymouth, Conn.; Joseph Long, W. Hartford, Conn.; Lymon Maytubby, Winsor, Conn.; Beverly Montresor, West Hartford, Conn.; Susan Moore, Unionville, Conn.; Teresa Patch, Amsterdam, Netherlands; Russell Pollnow, Manchester, Conn.; Gary Prignon, Plainville, Conn.; Anthony Retartha, Burlington, Conn.; Mary Jo Round, South Windsor, Conn.; Christopher Machnich, Glastonbury, Conn.

[73] Assignee: ITT Corporation, New York, N.Y.

[21] Appl. No.: 392,842

[22] Filed: Aug. 11, 1989

[51] Int. Cl.$^5$ .................. G06F 15/22; G06F 15/24
[52] U.S. Cl. .................................................. 364/401
[58] Field of Search ............................. 364/401, 408

[56] References Cited

U.S. PATENT DOCUMENTS 4,831,526  5/1989  Luchs et al. .................... 364/401
4,914,587  4/1990  Clouse ............................ 364/408

OTHER PUBLICATIONS

Consultant's Report, Mar. 15, 1991.
"Insurance Solutions", Software program product description, J. P. Sedlak Associates, Inc., New York, NY, 1985.
"WINS Claims" software program product description, The Wheatley Group, Ltd., Melville, NY, 1982.
"ILA3-On-Line A & H Claims System", software program product descriptiion, Network Associates, Cedar Rapids, IA, 1986.
"XY-Claim" software program product description, XYCOR, Inc., San Diego, CA, 1981.
PC-File/R version 1.0 User's Guide, ButtonWare Inc., Bellevue, WA, 1985.
"Automated Claims System (ACS)" software program product description McDonnell Douglas Integrated Business Systems, St. Louis, MO, 1984.

(List continued on next page.)

Primary Examiner—Gail O. Hayes
Assistant Examiner—Laura Brutman

[57] ABSTRACT

A computerized system and method for managing work in process is provided. An initial transaction records case specific information. The case specific information is automatically linked with a work source index which includes basic client information. An electronic file is created for each case arising out of the initial transaction record. As work is performed on the case, the system tracks its progress and providces a variety of support functions. An electronic activity log function maintains a record of key activities involved in the processing of work items. An electronic diary function provides a means for prioritizing work and for scheduling various tasks. A staff table function provides a facility for storing information relevant to office personnel. Most of the system functions are integrated with the staff table function which provides a number of security and function parameters. A text processing function is provided which integrates stored database information into preformatted and customized documents. A "local data" function provides a facility for customization of data recordation and output at the local level. Various other systems functions provide the ability to modify, update, search and record additional case information.

22 Claims, 8 Drawing Sheets

OTHER PUBLICATIONS

"Claims Management Systems", software program product description, Heritage Computer Corp., Sheboygan, WI, 1974, 1986.

"General Insurance management System", software program product description, Kwok and Co., Inc., Edmonton, Alberta, Sep. 1987.

"Claims Management System" software program product description, Exeter Data Processing Service, Inc., Warren, MI, 1985.

"Claims Management" software program product description, Mitratech, Inc., Santa Monica, CA, date unknown but prior to 1989.

"GenPac" software program product description, California Interactive Computing, Northridge, CA, 1977.

"Claims Administration" software program product description, Data Management Corp., Data Point, CA, 1987.

"Claims Administration System" software program product description, Allied Insurance Services, Inc., Duluth, GA, 1982.

"Paccasso" software program product description, Conway Computer Consultants, Inc. Ridgeland, MS, 1986.

"CompTrack" software program product description, Weyerhaeuser Information Systems, Tacoma, WA, 1985.

"Claims and Damage Tracking System", software program product description, Dynamic Resources Inc., Atlanta, GA, 1986.

DIARY

ACTION DIAGRAMS

[ *Title Block
    Identifies a series of related processing steps with a title comment.

[ Block
    Identifies a section or a simple condition (If with no Else)

[ SelectionBlock

A case construct
  (i.e. only one of the options is performed)

[ Repetition

Until some criteria is met

FIG. 6

COMPUTER SYSTEM AND METHOD FOR WORK MANAGEMENT

TABLE OF CONTENTS

A. FIELD OF THE INVENTION
B. BACKGROUND OF THE INVENTION
C. OBJECTS OF THE INVENTION
D. SUMMARY OF THE INVENTION
E. DESCRIPTION OF THE DRAWINGS
F. GENERAL DESCRIPTION
G. DETAILED DESCRIPTION
  1. System Security
  2. System Controller
  3. Menu Screens
  4. The Loss Processing Transaction
  5. Routing and Assigning Claims
  6. Modifying or Augmenting the Loss Processing Transaction Information
  7. Review of Claim Files
  8. Transfer of Claims Between Claims Offices
  9. Staff Tables
  10. Directory Tables
  11. Info Search
  12. Activity Log
  13. Claim Reassignment
  14. Claim Status Changes
  15. Text Processing
  16. Print Queues
  17. Payments
  18. Windowing
  19. Mailboxes
  20. The Diary Function
  21. Ad Hoc Reporting
  22. Local Data
  23. Work Management System
H. CLAIMS

A. FIELD OF THE INVENTION

This invention relates to computer systems and methods, and more particularly to such systems and methods for work management and the like.

B. BACKGROUND OF THE INVENTION

The processing and tracking of work in process in most environments is virtually non-existent or intensely manual. By way of example, the processing and tracking of damage loss claims has been a time-consuming, mostly manual process requiring multitudes of paper records. As such, claim processing and tracking is expensive, complex and relatively unreliable in maintaining the collected information.

In a typical prior art claim processing system, a claims office receives an initial notice of a loss from an insured, a claimant, a customer or an agent. The loss notification is received by mail, telephone, or in-person. By way of example, when a notice of loss is received by mail in the claims office, it is sorted into the appropriate line of insurance business (e.g. workers' compensation, automobile, property/liability, fidelity/surety etc.)(See FIG. 1). Loss notices are then delivered to one or more assistant managers and/or unit supervisors who review the notices and determine which claim "handler" actually will work on the claim(s). The supervisor also determines a diary date which is recorded on the original file to check on the status of the claim and the assigned handler's progress. The supervisor then sends a copy of the notice to that handler and calculates and notes the specific reserves to be set aside for the claim.

The original notice is given to a clerk for manual issuance of a claim number from a Register Book and for input into FOCS. (FOCS is a computer based claim recording system which relies on a mainframe computer located at a remote location to record the notice of loss. The FOCS system is used to record only actual claims and to issue certain payments. No claim adjustment support is provided to assist a claim handler in the progress of a claim to conclusion. The purpose of FOCS is essentially to assist in the maintainenance of corporate financial records.) After the notice of loss information has been input into FOCS, a file is prepared and filed.

On a daily basis, clerks search all "open" files for claims with a diary date matching the day's date (See FIG. 2). All applicable files are removed and given to the appropriate claim handler or supervisor. After the necessary action is taken the files are refiled and any new diary dates noted.

When a claimant or insured calls to check on the status of a claim the handler, supervisor or clerk must again retrieve the file from wherever it is filed (See FIG. 3). The file is reviewed as necessary and then left for a clerk for refiling. At any time while the file is not properly filed, no correspondence received or other document can be placed in the file without undertaking a search for the file.

During the time the claim is "open", key events must be recorded in an Activity Log to provide an audit trail. (The Activity Log is one or more preprinted sheets of paper which are affixed to the inside of the claim file.) As these key activities occur, the claim handler is obligated to record them in the Activity Log. If the file is not located immediately, it becomes likely that the key event(s) will be recorded inaccurately or not at all.

When work on the claim has been completed, the handler requests that the file be closed. (See FIG. 4). A closure statement is input into the FOCS system to update the corporate record and the file is stamped closed and filed in a "closed" file bank. After a specific retention period all files are put in dead storage and then eventually destroyed.

As can be clearly seen, the prior art claim processing system, like most work processing systems, requires that the file be available for virtually every activity. Thus, when files are not found in their normal location, problems arise. Still further, recording of specific key events in the Activity Log and the maintenance of diary dates depends on human diligence. As such, many things which should be done or recorded never get completed in a timely manner.

C. OBJECTS OF THE INVENTION

Accordingly it is an object of the present invention to provide a system and method for alleviating the foregoing problems and improving upon the prior systems and methods.

It is another object of the present invention to reduce the time to respond to telephone inquiries about work in process.

It is a further object to automatically and securely maintain a record of the activities of staff members in work processing.

It is yet another object to minimize the time to prepare and complete forms, letters, reports and checks in processing work.

It is a still further object to reduce paper intensity in the maintenance of records in processing work.

D. SUMMARY OF THE INVENTION

In accordance with the present invention, there is provided a system and method for substantially automating work management. To illustrate the capabilities of this system and method, reference is made to the processing of claims. This reference should not be construed as a limitation on the application of this system to other work environments.

In one preferred embodiment of the present invention supervisors and other staff members are provided with the ability to maintain an accurate record of all activities undertaken in the processing of a claim and the further ability to quickly and easily access the complete claim file at any time. In practice, the processing of a claim begins with the receipt of a notice of a loss from an insured, a claimant, a customer or an agent. These loss notices are received by mail, telephone, in person or electronically. The information from these notices is keyed into a local computer where a separate electronic file or record is created for each loss. (When the notice is transmitted to a claim office electronically it is put in the form of information which can be used to prefill fields in an Initial Input or Loss Processing transaction. This greatly cuts down on input time.)

In a preferred embodiment of the present system and method, an operator accesses the local computer through a terminal where he requests (usually through a displayed menu) a series of input screens called the Loss Processing Transaction ("LPT"). These screens, which comprise the LPT, each have a number of empty fields preceded by descriptive prompts. Information is input into the local computer, in accordance with the descriptive prompt, from the notice of loss. A separate series of LPT screens is available for each line of insurance business (e.g. workmen's compensation, automobile, property/liability, fidelity/surety, etc.). Thus, the particular LPT screens which are displayed to the input operator are formatted according to the particular line of business which is the subject of the claim.

The LPT is designed to capture information relevant to claim recording and to the loss adjustment process. All data relating to a claim which is collected, is stored in a locally supported database adapted to interface with a remotely located host computer ("Host") and its databases. The Host computer preferably maintains policy information and other information, used in the loss adjustment process, that is also employed in the regular activities of the company.

If, for example, the claim is related to an automobile, a variety of relevant information is input from the notice of loss and other sources (e.g. the insured's policy, police reports, interviews, etc.), including: information about the insured, information about the insured's policy, information regarding special procedures to be undertaken in the processing of the claim, a description of the accident, a description of any physical or property damage, information regarding any injured party, information about witnesses and/or passengers and any other relevant comments. All this information need not be input into the claim file created with the LPT immediately; it may be added subsequently as more details are uncovered during the investigation of the loss.

Prior to inputting the notice of loss information, the insured's policy information is verified by extracting such information from the local computer's databases or by interfacing with the Host and its databases, depending on where the policy information resides. This information "prefills" certain fields in the LPT thereby minimizing operator input.

Once the information requested in the LPT is input, and stored in a local database, the transaction is normally "routed", by the input operator, to a supervisor to access and review the file ("routing" generates a brief message to another staff member's "mailbox"). When a claim is routed to a supervisor, the message generated to the supervisor's "mailbox" (discussed in detail below) is a brief summary of the claim transaction. After reviewing the claim, the supervisor electronically assigns it to a particular staff member, sets at least one due date ("diary" date) for review of the progress of the claim and sets aside reserves (based on his experience and calculations) to cover the expected cost of the claim. The electronic assignment transmits a claim summary message to the assigned handler's "mailbox" in the same way the claim was originally "routed" to the supervisor.

When the claim is assigned and routed to a claim handler, an automatic numbering facility assigns the next available, appropriate number(s) to the claim(s). This facility eliminates the extra, manual step of ascertaining the next unused number(s) and recording it on the claim file and elsewhere.

The assignment of diary dates for the supervisor is done either manually or automatically. Automatic dates are calculated and set by the system based on the type of claim and the handler's experience. Manual dates are set to override or augment the automatic dates set by the system. Dates also may be set in the "diary" by the claim handler or any other staff member with appropriate authority.

Individual claim files are accessible directly by selecting a particular diary entry. When the claim is accessed from the diary in this manner an "Activity Log" associated with the particular claim is displayed. This permits the handler or supervisor to find out the most recent activity undertaken or to see particular instructions which should be followed. If a diary entry is not accessed or "rediaried" as of its date, it will "rollover" to the succeeding day until it is accessed and rediaried. This prevents dates from being missed due to an unexpected absence or illness. If a diary date rolls over too many times an "alert" message is generated to the handler's supervisor.

The diary also acts as a work load monitor because the number of claims which should be "diaried" for any given day is limited. If a supervisor/manager attempts to set a diary date on a new claim for a particular handler when the diary listing for that handler already has the maximum number of claims to be reviewed for that day, a message is displayed to the supervisor (Despite the message, the supervisor can still assign the diary date, if he desires). In this way, work can be more efficiently distributed throughout an office and one particular handler should not be overburdened.

When an LPT is used to input a notice for a new claim, an electronic Activity Log is automatically created along with the new claim file or at the time of the first activity. An Activity Log is essentially an overview of key activities associated with the loss adjustment process (e.g. payments, interviews, correspondence, etc.). Comments are electronically entered into the log to document these activities through normal keyboard entry or automatically when a system driven activity is undertaken. The date and the operator's initials are automatically entered into the log with the entry. Entries into the log are readily accessible for review by an operator and are displayed in reverse chronological order so that the most recent entries appear first.

Whenever certain functions within the system are accessed, and activities undertaken therefrom (e.g. text processing or payments), entries are automatically made to the Activity Log for that claim. The entries summarize the activity without conscious effort by the operator. Each entry consists of the date, the operator, the activity and the specifics associated with that activity (e.g. check issued for $500.00 to John Doe, etc.). The extra steps which would be required to locate the log, recall the specifics of the activity, and make a manual entry are eliminated. A handler's memory is not involved at all and the log will thus be accurate and up-to-date. Still further, the log serves as an audit trail because the Activity Log entries, once made, are secure and cannot be changed.

In a preferred embodiment of the present invention, text processing is also included within the system. This provides automatic/semi-automatic generation of forms and letters tailored to the particular office and the particular claim. In practice, the text processing function is selected and a form or letter then chosen. Most of the pre-prepared forms and letters have blank fields embedded in them to make them specific to the appropriate claim. The system automatically attempts to fill in these blank fields from information previously entered and stored in the claim database. This saves time because the operator does not need to locate the basic claim information in a paper file or even key it in. If all the necessary information to complete the document is not available from the claim file, the operator is prompted to provide it manually. When all the required fields in the document have been filled, the document's text data is sent to a print queue where it is held until released to a printer. The documents are precoded to apprise the system and an output operator (an individual in charge of the printing of forms, letter and/or checks) of the proper paper on which the correspondence is to be printed and the number of copies to be generated.

It is also preferred that an automatic payment function be included in the system. There are typically four types of payments which can be made: closing payments, repetitive payments, partial payments and reopen/close payments (these payment types will be discussed in more detail in the Detailed Description). Checks may be automatically issued for any of the three types of payments upon selection by the claim handler. The empty fields on the various payment screens are prefilled from information previously entered into the claim file (database). If insufficient information is available in the claim file to print a check, the operator is prompted to manually input the missing information in the appropriate fields.

If the requested amount of a check exceeds the specific monetary authority of the person authorizing the request the check request is automatically routed to a supervisor for approval. Thus, all checks which are finally printed have been duly authorized.

There are two ways checks can be automatically issued. With the first method the check request is sent from the local computer to the Host computer where it is processed. The Host assigns a check number and sends a check printing command to a check printing queue for printing on a check printer located in the local office. With this method the local system is only involved in the front end of the transaction. The rest of the check transaction is handled by the Host computer.

With the second method the check request is processed by the local computer which debits the local office's account in real time. (With the first method the corporate account is debited off-hours after all checks have been issued for a given day). The assignment of check numbers occurs locally and the check printing command is issued by the local computer. The Host is typically apprised of the check transactions via batch uploading from the local computer at various intervals.

As indicated above, all payments generate an entry to the Activity Log including: amount, requester, nature of benefit, payee name and check number. This happens automatically without any effort on the part of an operator.

In a preferred embodiment of the present invention, an interactive Help system is available. The Help system is generally invoked from any screen, during any operation of the system, throughout the processing of a claim. It is activated by actuating one or more "function" keys at a terminal (i.e. separate keys which do not normally generate alphanumeric characters on the display screen). The Help function initially displays transaction and/or field specific codes which are used for filling in data fields within the various screens. Actuating still other function keys provides an explanation as to how to select and move between modules and operations within the system and accomplish various transactions or activities. The Help function is used to assist an operator in the proper input of information and the manipulation of screens and functions.

An "Info Search" feature, in a preferred embodiment of the invention, permits any operator to check on the status of a claim based on only minimal information, such as: the insured's last name, the claimant's last name, the insured's policy number or the claim number. (When a claim file is created this "minimal information" is automatically entered as a record into a separate Info Search file for this purpose.) This feature is particularly valuable when an insured or a claimant telephones to check on the status of a claim. With the Info Search feature, it is not necessary to physically retrieve a paper file which may or may not be complete. Rather, the operator who receives the telephone call simply accesses Info Search function and inputs the appropriate name (full name, partial name or phonetic equivalent) and/or number to locate the electronic Info Search record containing the "minimal information". If the caller needs more detailed information, the complete claim file may be accessed, including its up-to-date Activity Log. From this an operator can quickly and easily provide the caller with a complete status report. Correspondingly, with a minimum of effort, the Activity Log may be updated to include any information imparted during the telephone call.

Directory Tables, which are included in a preferred embodiment of the present invention, function, in part, as an online telephone/address book. Any name, telephone number, address and tax code may be keyboard entered and stored in the Directory Tables. These entries are then accessible by name and can include attorneys, claimants, doctors, state agencies, etc. The Directory Tables are not claim specific and are shared by the entire office. These tables are also integrated with other system functions (e.g. Text Processing, Payments, LPT, etc.) to prefill information into their respective data fields, as necessary.

A Staff Table function provides, online, a record for each member of the claim staff. Each record includes the current title, diary limit, authority level and supervisor of the staff member as well as the maximum case load of that member. The Staff Table function is integrated with virtually every other system function. The information contained in the various Staff Table records (referred to hereinafter as "the Staff Tables") is used to verify and prefill various data fields in other system functions. The authority level, diary limit and caseload limits of each staff member are set by supervisors with appropriate authority and entered into the Staff Tables. These records can be modified, deleted or added as necessary.

Statistics regarding claim assignments are stored and monitored to determine individual and office-wide performance through a caseload monitoring function. This function allows a supervisor to assess the general nature of an individual's work load and to examine a staff member's progress on groups of claims. This feature assists the supervisors in assigning claims to particular handlers and making more efficient use of the staff.

A windowing function also is provided in a preferred embodiment of the present invention. The windowing function permits an operator to work on more than one claim by opening a "window" into other claim files while still others are being processed. (The operator can only enter data into one claim file at a time, but can switch back and forth between the various files.) This feature also allows the operator to access a second function, such as the Activity Log, and enter new information while in the middle of performing some other task (e.g. reviewing a diary). Lastly, this feature may be used to access information from the Host computer without foregoing operations undertake using the local computer. This is particularly useful when investigating the details of a policy where policy information is stored on the Host.

Just as claims can be assigned to a particular handler, they can be reassigned as well. In a preferred embodiment of the present invention, the system is capable of reassigning one or all of an individual's claims to one or more handlers or supervisor. This is helpful, for example, when a handler or supervisor is ill for an extended period of time or leaves the office permanently. The reassignment is done electronically so that the reassigned claims are passed to the new handler intact. The notice of reassignment is sent to the new handler's or supervisor's "mailbox."

As indicated above, when a claim is routed electronically from one person to another, a summary of the claim, in message form, is sent to a person's "mailbox". The mailbox, of the present invention, is analogous to an electronic in and out box. When a supervisor assigns or reassigns a claim to a handler a message appears on the handler's mailbox screen indicating that he has an assignment. Assignments are viewed through the handler's mailbox, but the complete file may be accessed to determine the actual steps to be taken.

The mailbox screen also indicates to a supervisor whether any alerts have been generated (e.g. authority level exceeded for check issuance, etc.). This enables a supervisor to pinpoint certain office problems automatically.

A number of print queue managers are also provided to allow an output operator to monitor the flow of reports, forms, letters and checks to be printed. This is helpful when a number of lengthy or specialized print jobs have created a backlog at the time that a top priority print job is sent to the printer. The print queue managers enable an output operator to shift the print jobs in the print queue to accommodate those with higher priority. The print queue managers also display any special printing information, such as number of copies, type of paper, etc.

A specialized feature, which is part of a preferred embodiment of the present invention is referred to generally as "local data." The local data feature includes a screen or set of screens which have been generically formatted to accommodate database fields of numeric, date and alphanumeric data. (A set of these screens is available for input and display for each claim). The particular display configuration of the screen or screens is selectable by the individual claims office. The purpose of the local data feature is to permit each claims office to design its own display screens to accommodate specialized information which the office desires to maintain. This information primarily is of the type needed to complete specific state agency filing requirements, but it may be used simply for statistical purposes or customer needs. The data input through the customized screens created with the local data function is intended to be kept locally in the claims office and not communicated to the Host.

In a preferred embodiment of the present invention an Ad Hoc Reporting function is provided. This function relies on a standard database query to extract information from any system database. The Reporting function may be employed to extract any combination of data required and to output the data in a user designed format. For example, this function can be used to determine all office payments for any given time period.

The Local Data function provides each office with the same number of generic numeric, date and alphanumeric fields (each of which is also of a predetermined length) to arrange into customized screens. Once these fields have been arranged into a particular display format for use in a local office, they can only be modified by an operator with the proper level of authority. Any number of these fields can be employed and there is no requirement that all/any of them be used. Since the fields are generic, they can be used in any format to store any information desired by the local claims office as long as the information conforms to the field designations. The Local Data function is integrated with Text processing such that customized forms and letter can be generated which rely on the information input through a Local Data screen or field. Since the information input through Local Data is maintained on a local database it is also available for extraction through the Ad Hoc Reporting function.

As can be clearly seen, the present invention yields substantial improvements over prior systems. Other features and advantages of the invention are set forth in the following description and drawings.

E. DESCRIPTION OF THE DRAWINGS

FIG. 6 is an explanatory diagram depicting the construction of an Action Diagram;

F. GENERAL DESCRIPTION

Figure 1:
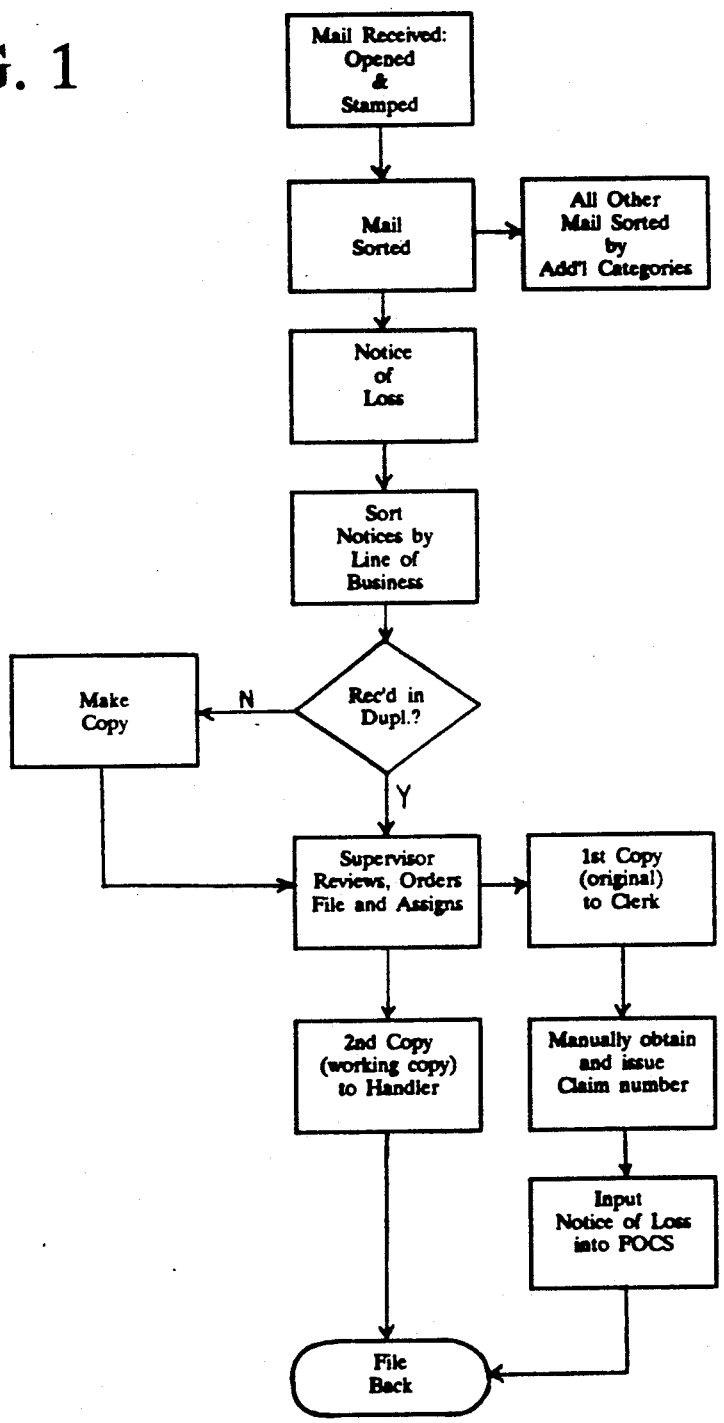
FIG. 1 is a flow chart depicting the manual steps undertaken when a notice of loss is received in a prior art claims office.
Figure 2:
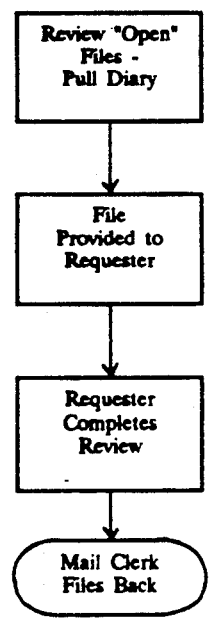
FIG. 2 is a flow chart depicting the manual steps associated with the use of claim diary in a prior art claims office.
Figure 3:
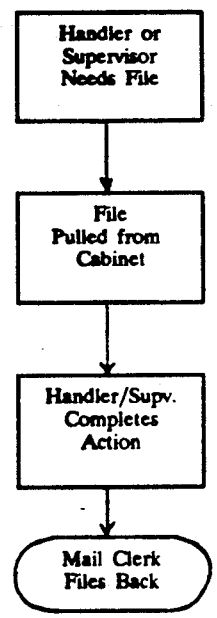
FIG. 3 is a flow chart depicting the manual steps associated with the receipt of a claim status inquiry in a prior art claims office.
Figure 4:
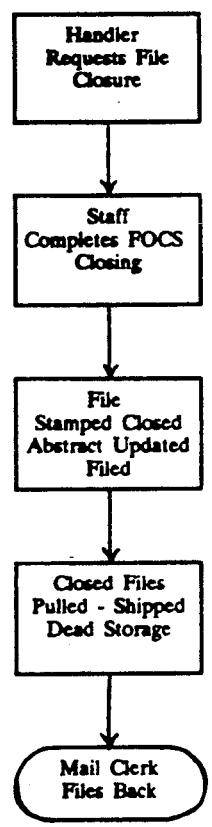
FIG. 4 is a flow chart depicting the manual steps associated with the "closing" of a claim file in a prior art claims office.
Figure 5:
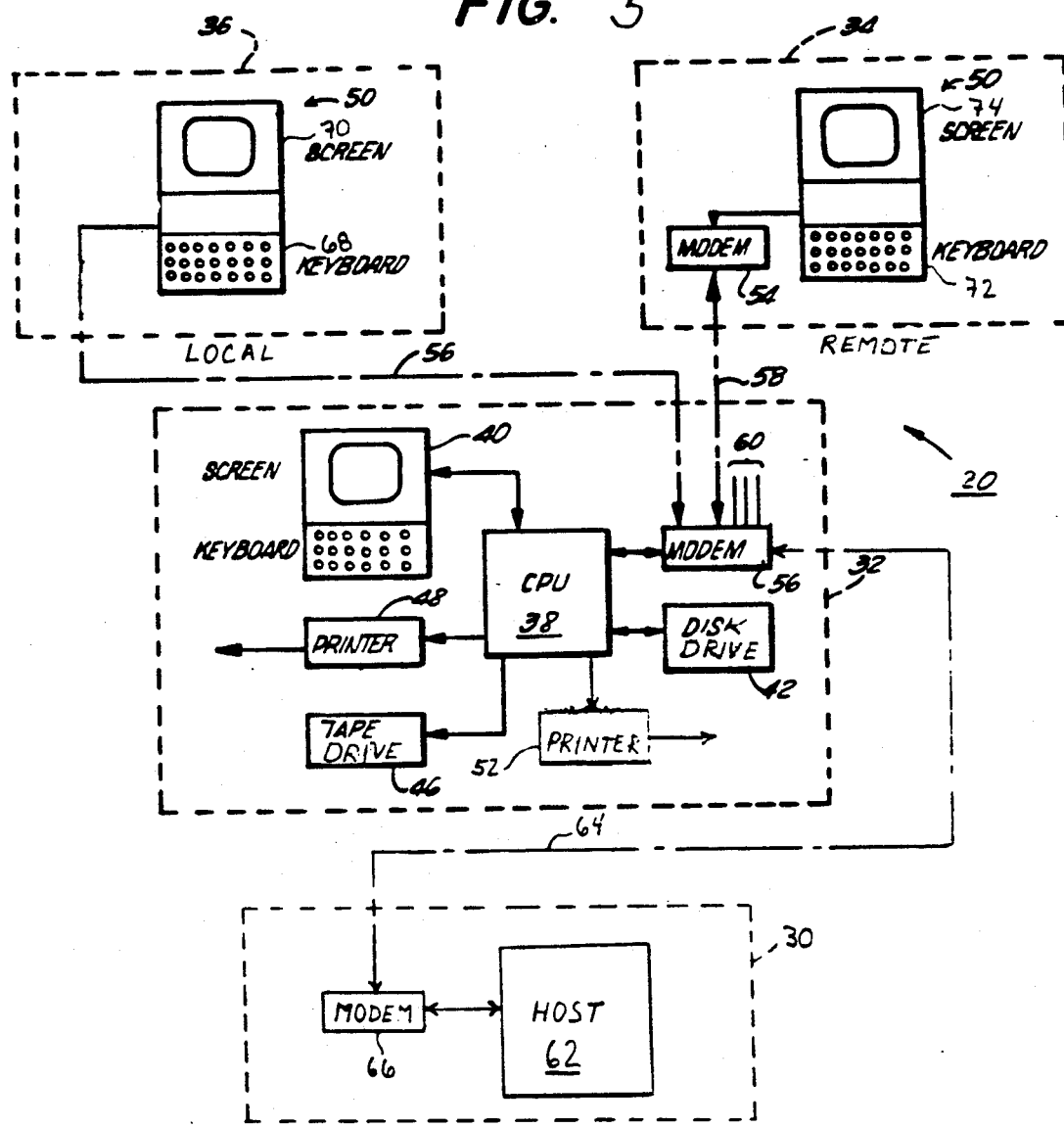
FIG. 5 is a schematic diagram of a work management system constructed in accordance with a preferred embodiment of the present invention.

FIG. 5 illustrates schematically a portion 20 of the system of the invention. The system portion 20 includes local data processing equipment at a first station 32, Host data processing equipment at a second station 30 and two separate sets of display input/output equipment at two other stations 34 and 36. (Although only two display input/output stations 34 and 36 are shown in FIG. 5, it should be understood that it is preferred to use more stations than two.)

In a preferred embodiment of the invention the Host data processing station 30 is located at a remote location. The local data processing station 32, output printing equipment 48 and 52, and the display input/output equipment 50 are all located in the claims office. (Some display input/output equipment 50 may be located at remote stations 34. Communication between the local data processing station 32 and this remote display input/output equipment 50 occurs via the modem 60.)

The data processing equipment located at the claims office includes a computer CPU 38. The computer is preferably a moderately high-speed, high-capacity computer such as a Wang VS, however, the computer can be any general purpose digital computer having sufficient speed and capacity for processing data in the system.

Also located at the claims office is a plurality of input/output devices 50, each comprising a keyboard and a display screen which are used for programming purposes as well as data input and review. The output printing equipment 48 is used to print out checks, forms, reports and various types of correspondence.

A modem 60 is used for sending and receiving data over telephone lines 64 to a modem 66 provided at the Host computer 62.

When a notice of loss is received in a claims office, an operator inputs the information received in that notice through the keyboard 68. The information is then transmitted over intraoffice lines 56 to the local computer 38 which stores the information on a disk at a disk drive 42. Information regarding the claims file which is created is routed through the intraoffice lines 56 to the electronic "mailbox" of a supervisor for review.

Typically, the supervisor reviews the newly created file on his display screen 70 and through his keyboard 68 assigns a claim handler to it and sets aside reserves. The supervisor then routes the claim (in the form of a claim summary message) to the designated handler's "mailbox" through the intraoffice lines 56.

As the claim handler processes the claim he normally accesses various functions in the system including the diary, the Activity Log, the payment transaction, etc. Each function is accessed through a keyboard 68 and consists of numerous preformatted screens which are displayed on a display screen 70. The functions are preprogrammed and run on the local computer 38. The information input in response to prompts in the functions' preformatted screens is stored in the local computer 38.

When a form, letter or check needs to be prepared, the appropriate function is accessed through a keyboard 68, the preformatted screens associated with the function are displayed on a display screen 70 and any necessary information input through a keyboard. The output to be printed is routed through intraoffice lines 56 to a local printer 48 or 52 where it goes into a print queue. (Print queue managers are available to control the printing priority). Upon exiting the print queue, the output is printed by the local printer 48 or 52 reviewed and sent out.

As mentioned above, the Host computer 62 interfaces with the local computer 38. In practice, the Host computer 62 communicates with the local computer 78 through its modem 66, the phone lines 64 and the local modem 60. In response to a request from the Host computer 62, the local computer 38 copies certain information stored in the local database and uploads it to the Host computer 62 and vice versa. This information then resides in both the Host computer 62 and the local computer 38. It is not removed from the local computer's storage facility 42 or 46.

Other valuable features of the invention will be discussed in the more detailed description which follows.

G. DETAILED DESCRIPTION

As indicated in the previous section, reference is made to the processing of claims to illustrate the features and capabilities of the system and method of the present invention. It should be understood that this is a description of only on preferred embodiment and other embodiments may be accordingly prepared by one of skill in the art.

1. System Security

In order to prevent the theft of data, the unauthorized issuance of checks, system vandalism, etc., a security system is provided to limit access to the system of the present invention. In one preferred embodiment of the present invention, an off-the-shelf security system called MENUTECH ® is integrated into the System. However, any security system which conforms to the below listed criteria can be employed.

Each employee in an office is assigned to a particular security level based on his responsibilities. The security level is used to limit the system functions and transactions which ca be accessed or performed by the employee. Initially, each employee is given a User ID (usually his initials) and a password which limit his system access to his assigned security level.

When an employee wishes to use the system, he must first "Log On" using his User Id and password. Table I shows a sample of the first screen displayed on a display screen 70 at any terminal 50. (All tables included herein are illustrative of screens displayed during the operation of a claim processing system called "CAS" for Claim Automation System.)

If the User Id and password are entered correctly, the system validates them and a second password screen or a Main Menu screen for the operator's appropriate security level is displayed. If an incorrect password or User Id is entered, a message appears and the operator is prompted to re-enter the incorrect term. After five unsuccessful attempts, an error message is displayed and the operator is locked out of the

TABLE I

* Wang VS Logon *

Workstation 38    9:31 AM    Monday    April 19, 1989

Hello new user

Welcome to CAS

Please identify yourself by supplying the following information

Your userid = _____

Your password = _____ system. (An alert is also simultaneously generated to a supervisor.) If the password entered has expired (most passwords remain active for 30 days) a Password Expiration screen (not shown) is displayed. This screen permits an operator to select a new password and then access the system. It is not necessary to wait until a password expires. Rather, passwords can be changed at any time through a Password Change screen (not shown).

2. System Controller

The System Controller is a program module that manages and controls every CAS session. It does this by controlling the timing and execution of all CAS functions. The Controller is based on a CAS model transaction which is the blueprint for every CAS online transaction.

Figure 7:
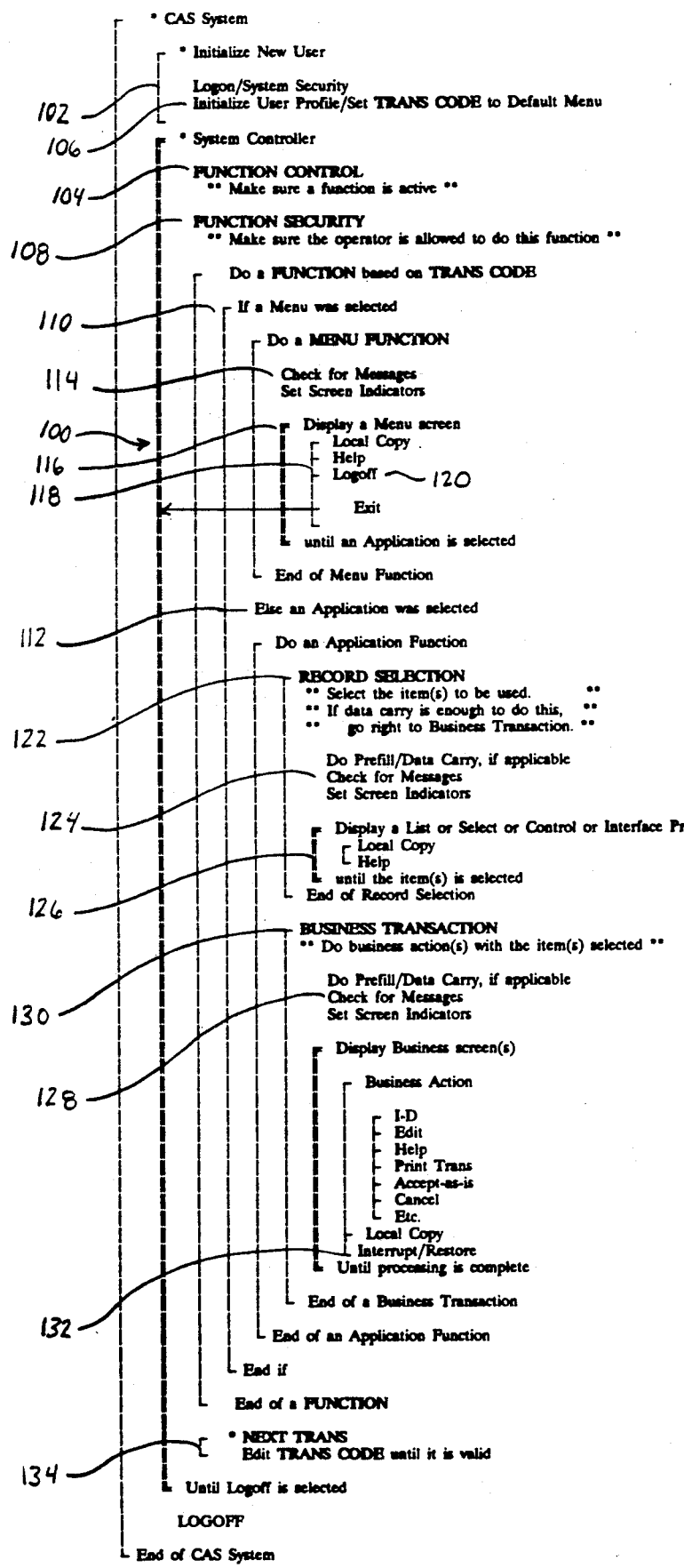
FIG. 7 is an Action Diagram illustrating the computer program and operative steps of the System Controller.

FIG. 7 is an Action Diagram of an overview of a successful CAS session. (As shown in FIG. 6, an Action Diagram is analogous to a sideways flow chart. The nested brackets depict various functional steps occurring under the umbrella of other functional steps. Double lines indicate a loop, while single lines with multiple bracket ends indicate a choice of functions. Wording between two pairs of asterisks is merely explanatory in nature.) As indicated at 102, entry into the CAS system must be achieved prior to the takeover of all operations by the System Controller 100. After the System Controller has assumed control it first verifies that the requested transaction is available for use within CAS 104 (Primary and default menus are not subject to this verification since, if the system is available these menus must be available as well. The code to invoke the Default Primary Menu is given automatically after successful logon and just prior to takeover by the System Controller 106). Once the System Controller 100 verifies the availability of the requested function it must insure that the operator has the proper authority to invoke the requested function 108. This is done by comparing the function's required authority level with the System Security (Menutech) authority level. If the operator has the appropriate authority, the function is "run".

Two types of functions may be invoked, either a menu 100 function or an application function 112. If a menu function is selected, the System Controller 100 first checks for messages and then displays any appropriate screen indicators 114. Next, the selected menu is displayed 116. A number of options are available from within a menu including: Help, Local Copy, Logoff and a variety of application functions 118. Help and Local Copy do not cause any change in the system location, Logoff 120 exits the system entirely, while the selection of an application returns the System Controller to the Function control position 104.

If an application function is initially selected 112 the record to be acted upon must be selected 122. This involves either the entry of a new claim number or the selection of "Data Carry" when leaving a previous function. (The selection of Data Carry carries the same claim with its corresponding information to the next function.) If Data Carry is not used, the System Controller first checks for any messages and displays appropriate screen indicators 124. It then provides a screen or screens which permit the selection of a claim number 126.

Once a claim number has been chosen the System Controller again checks for messages 128 before undertaking any business transaction 130. (A business transaction is the part of a function which changes or creates a specific record or set of records.) Any business transaction can be interrupted 132 to "window" to another function of a different type. The original transaction is restored 132 when the operator windows back out of the other function.

Figure 8:
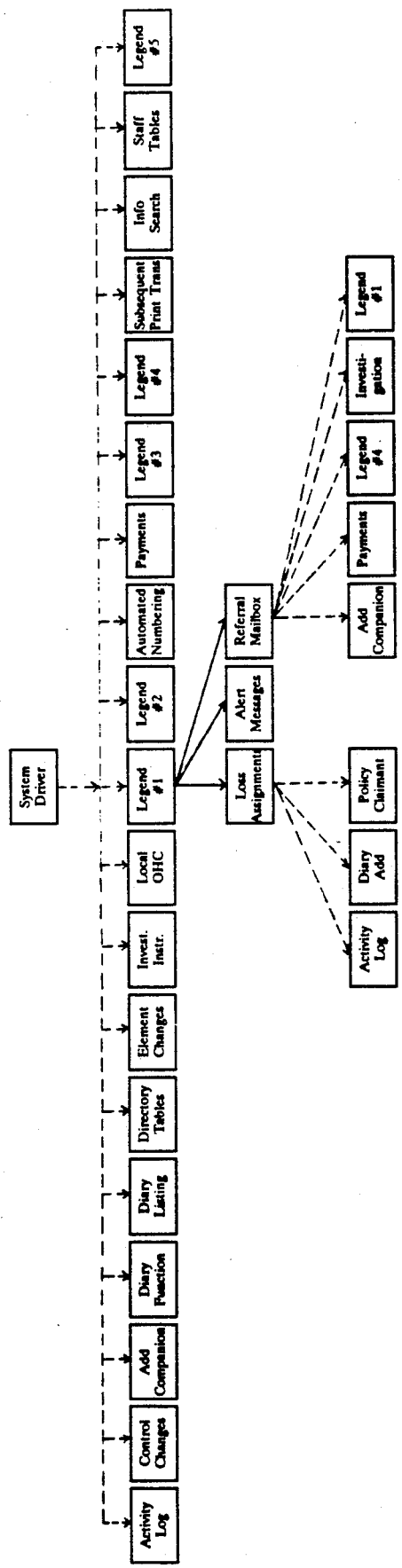
FIG. 8 is a block diagram depicting the interrelationship of the system functions.

Just prior to completing the business transaction the operator can place a four letter code in a 'Next Trans' field to specify the next function to be undertaken 134. When the business transaction is then ended, the function is exited and the System Controller returns to the Function Control position 104 to evaluate the next requested function. (The following is a partial list of available functions: Loss Processing Transaction, Activity Log, Diary, Directory Tables, Info Search, Payments, Reassignments, CAS Secondary Menu and TEXT Processing. All the available functions are shown in block form in FIG. 8).

3. Menu Screens

The CAS menu screens serve as a table of contents enabling an operator to select a desired system function or transaction. Following a successful logon, the system displays a Default Primary Menu tailored to the operator's specific needs and security level. (See, e.g., Tables II and III, for screens designed for a claim handler and a supervisor). The appropriate Primary Menu screen for a particular operator is determined by a Default Menu Number which is entered in the operator's Staff Table.

TABLE II

SUPERVISOR MENU

Press a PFKey below or RETURN to do Next Trans: _____

| | |
|---|---|
| 1) Activity Log | 10) Mailbox Menu |
| 2) Claim Status Changes | 11) Nature of Payments |
| 3) Diary Function | 12) Payments |
| 4) Diary Listing | 13) Reassignments |
| 5) Directory Tables | 14) Wang OFFICE |
| 6) Info Search | 15) CAS Secondary Menu |
| 7) Investigative Instructions | |
| 8) LP Control Change | |
| 9) LP Element Change | |

32) Logoff

A Secondary Menu, shown in Table IV is also available. This Secondary Menu displays less frequently used functions and transactions. Using the Primary Menu or the Secondary Menu, an operator can access virtually any available system function.

TABLE III

CLAIM HANDLER MENU

Press a PFKey below or RETURN to do Next Trans: _____

1) Activity Log
2) Claim Status Changes
3) Diary Function
4) Diary Listing
5) Directory Tables
6) Info Search
7) LPT Inquiry
8) LP Control Change
9) LP Element Change
10) Mailbox Menu
11) Nature of Payments
12) Payments
13) TEXT forms Selection/Completion
14) Wang OFFICE
15) CAS Secondary Menu 32) Logoff System functions are accessed from the Primary or Secondary Menus by actuating the "PF" or "Function" key corresponding to the desired function (e.g. a PF1 or F1 key is pressed to access the Claim Status Change function from the Secondary Menu, the PF5 or F5 key is pressed from a Main Menu to access the Directory Tables function, etc.).

4. The Loss Processing Transaction

The processing of a claim begins upon receipt of a notice of loss. These "loss notices" are received from agents, insureds, customers or claimants, either through the mail, in person, electronically or over the telephone.

TABLE IV

CAS SECONDARY MENU

Press a PFKey below or RETURN to do Next Trans: _____

1) Claim Status Changes
2) Diary Function
3) Diary Listing
4) HTC Sent
5) Investigate Instrs.
6) Local OHC
7) Loss Processing Trans
8) LP Control Change
9) LP Element Change
10) LPT Inquiry
11) LPT Subsequents
12) Payment Corrections
13) Reassignments
14) Staff Table
15) Subsequent Print Trans
17) Text Forms Selection/Completion
18) TEXT Print Queue
19) Word Processing
21) 3270 Emulation
22) DPSA Security Functions
23) Forms Maintenance
24) Text Processing 16) Return to Previous Menu
32) Logoff In a typical claims office, a person called a Claim Assistant is primarily responsible for the input of loss notices into the CAS System. The loss notice information is input through a Loss Processing Transaction ("LPT") function which may be accessed from a Primary Menu (see, e.g., Tables II and III) or by placing the four letter code 'LPTX' in the 'Next Trans' field of any transaction.

The first screen displayed when the LPT function is accessed is shown in Table V. This is the Loss Processing Transaction Interface screen. This screen is used to input skeletal policy information which, in turn, is used to extract policy information from a Policy File which may reside in one of the Host Computer's databases or in a local database. (Even if some of the policy information is maintained in one of the Host's databases, most claim's offices have a Policy Index Table which tracks the name, address, policy number, etc. of its large accounts. This Policy Index is available for display through the CAS system to assist in the proper extraction of policy information.) The main element required to extract policy information from the Policy File or Policy Index Table is the policy number. If no policy record is found in a Policy File or Policy Index Table, an explanatory error message is displayed and the information must be input manually. (Even if no policy number is found, the loss report must still be maintained. Therefore, a "non-claim" "record report" is maintained on the system.) When information is successfully extracted from the Policy File or Policy Index Table, the initial input fields (i.e. the Interface Screen fields) are protected to preserve the credibility of the extracted data.

Upon completion of the LPT Interface screen, the 'Enter' key is pressed and a series of loss screens particular to a single "line of business" are displayed. The loss screens are formatted according to a policy symbol (indicating the type of policy) and the line of business specified on the Interface screen. These screens contain policy/insured and loss/claim description data. The number of screens and their sequence is relative to the number of claims arising from the loss occurrence and the manner in which the loss was reported.

The initial screens accessed contain fields for inputting required information that applies to the entire loss occurrence. Reporting screens are used to record information which is specific to an individual claim arising out of the loss occurrence. Screens are also available for entering Witness, Contact/Comment information and Special Procedures, if applicable. Where the notice of loss is received electronically from agents, insureds, customers or a central reporting center, the information is in a form which is used to prefill fields in the LPT. The electronically reported information must be reviewed for accuracy but this type of reporting substantially reduces input time.

The following is a list of screens specific to the automobile line of insurance business (which will be used as an example for purposes of this description) in their logical order of appearance (screens marked with asterisks will (potentially) become new claims):

Policy Information Screen (required)
Special Procedures (optional unless extracted from Policy Index Table)
Description of Accident (required)
*Claimant Screen (required)
*Physical Damage screen (required for certain types of policies—identified by claim symbol)
*Property Damage screen (required for certain types of policies)
*Injured Party Information screen (required for certain types of policies)
Witness/Passengers screen (optional)
Contact/Comment screen (optional)

TABLE V

| LOSS PROCESSING TRANSACTION | | LPTX |
|---|---|---|
| POLICY NUMBER: _____ _____ | LARS IND: | SERV EXPEDTR CODE: |

TABLE V-continued

AGENT CODE: _____

LOSS DATE: _____

REPT DATE: _____

INDICATE LINE OF BUSINESS: __
    1    AUTOMOBILE
    2    PROPERTY/LIABILITY
    3    WORKERS' COMPENSATION
    4    FIDELITY/SURETY

TELEPHONE FIRST REPORT: *    LOCAL PREFILL: X

ENTER) POLICY INFO   6) POLICY INDEX   18) HELP   23) LC   32) CANCEL

---

Table VI shows an Auto Policy Information Screen. Much of the information necessary to complete the input called for by this screen is prefilled or input through the LPT Interface screen and the information extracted from the Policy File (e.g. Policy Status, Policy Number, Agt Code, Loss Date, Insured Name and Address, etc.) Any additional information that is needed to complete this screen is input manually through the keyboard.

The Special Procedures screen, shown in Table VII, is accessed from the Policy Information screen and is used to note any special handling procedures, specific to the policy involved, that are required in the processing of the claim. Multiple screens are available for input and information can be added, modified or deleted as needed. If special procedures are enumerated in the Policy Index Table this screen will be prefilled.

TABLE VII
SPECIAL PROCEDURES

PERRY, FREDERICK                02 PH 123123

_____

_____

_____

_____

_____

_____

_____

ENTER) ADD   4) PREVIOUS PAGE   18) HELP   23) LC   16) RETURN
                3) NEXT PAGE

---

The Vehicle-Driver Coverage Information screen, shown in Table VIII, is used to enter information pertaining to the insured driver's coverage limits as well as

TABLE VI
POLICY INFORMATION

POL NUM: __ ___ ___
AGT CODE: ____         AGCY NAME:        SALESMAN CODE:

INSURED: _____   P/C: __ TITLE:
STREET: _____
   CITY: _____   ST: __   ZIP: _____
   BUS PH: _____   RES PH: _____   TIN:
   POL EFF: ___   POL EXP: ____   LOSS DATE: ___   REPT DATE:

FORMS/ENDT:

SPECIFY FORMS/ENDT AFF COV:

EXCESS IND:   CERT NUM:     LARS IND:     LARS LOC CODE:
SERV EXPEDITER CODE:

ENTER) VEH-DRIVER   3) SPECIAL PROCEDURES   18) HELP
   27) ERASE LPT      1) CLAIM SET-UP       19) SELF REFER
   23) LC           30) LOCAL DATA

--- vehicle information such as the make and model of the car. Any information which is prefilled to this screen can be modified. This screen is generally accesssed after information has been entered to the Policy Information screen. It may, however, be accessed from a number of screens within the LPT.

The Description of Accident screen, shown in Table IX, is used to enter information that applies to all claims in the Loss Processing Transaction. The information includes the accident dent screen and from other screens within the LPT to enter any relevant comments about the claim. This screen can also be used, for example, to indicate who should be contacted for further information if the in-

TABLE VIII
VEHICLE - DRIVER COVERAGE INFORMATION

CUSTOMER TESTER                                             02 PH 123123

| VEH NUM: | YR: | | MAKE: | MODEL: |
|---|---|---|---|---|
| VIN: | | | PLATE: | ST: |

| COV/DED | BI: | PD: | MED PAY: | NON COLL: |
|---|---|---|---|---|
| | COLL: | UM: | NO FAULT: | |
| | T/L: | RR: | FULL GLASS: | |
| | LIAB DED AMT: | | DED COV: | |

SPECIFY IF OTHER COV/LIMITS:
    MI:    LOSS PAYEE:
SPECIFY IF OTHER INSUR ON VEHICLE:
  ENTER 'X' IF DRIVER SAME AS INSD:
  DRIVER:                                    TITLE:
  STREET:

| CITY: | ST: | ZIP: | PHONE: |
|---|---|---|---|
| LIC NUM: | ST: | | |
| AGE: | DOB: | SEX: | MS: | REL TO INSD: |

| ENTER) DESC OF ACC | 19) SELF REFER | 18) HELP | 16) RETURN |
|---|---|---|---|
| 1) CLAIM SET-UP | 23) LC | 27) ERASE LPT | | description, location of accident, impact area, time of loss etc. This screen is generally accessed following input of the Vehicle-Driver Coverage Information screen, it also may be accessed from a number of screens within the LPT.

The Witness Information Screen (not shown) is accessed from the Description of Accident screen and is used to input basic witness information when necessary (e.g. name, address, telephone number, etc.). If information about more than one witness needs to be recorded, a Witness List screen (not shown) is available. This screen permits the viewing, addition, modification or deletion of witness information.

A Comments/Contact Information screen (not shown) can be accessed from the Description of Accident screen and from other screens within the LPT to enter any relevant comments about the claim. This screen can also be used, for example, to indicate who should be contacted for further information if the insured is unavailable.

A Responsible Party screen (not shown) may be accessed from the Description of Accident screen to enter any relevant information indicating responsibility for the loss. When all available information is entered through this screen, pressing 'Enter' automatically returns the Description of Accident screen to the display.

A Claimant Information screen, shown in Table X, is used to add claimant information (e.g. name, address, telephone number etc.) to the system. The information requested in the Claimant Information screen must be input before a claim can be added for that claimant. Once this information is input, multiple claims can be added for the same claimant as necessary.

TABLE IX
DESCRIPTION OF ACCIDENT                          LPTX

CUSTOMER TEST                                02 PH 123123

DESCRIBE ACCIDENT:

LOC OF ACCIDENT:

| | CITY: | ST: | ZIP: | |
|---|---|---|---|---|
| TIME OF LOSS: | IMPCT AREA: | NUM CARS: | CAT CODE: | CAT LOB: |

ENTER "X" IF SUBROGATION POSSIBILITIES:
INVEST AUTHORITY:
VIOLATIONS/CITATIONS:                                   VIOLATION CODE:
REPT TO:                      REPT BY:

| COVERAGE REQ: | RSK ALRT: | QUESTNBLE COV IND: | SVRTY IND: |
|---|---|---|---|

| 6) ADD CLMT | 14) WITNESS | 19) SELF REFER | 18) HELP | 16) RETURN |
|---|---|---|---|---|
| 15) COMMENTS-CONTACT | | 28) RESP PARTY | 23) LC | 27) ERASE LPT |

TABLE X
CLAIMANT INFORMATION

CUSTOMER TEST                                02 PH 123123

CLAIMANT - ENTER X IF SAME AS INSURED:    (IF NOT ENTER DATA BELOW)

NAME:                            P/C:     TITLE:

TABLE X-continued

| STREET: | | | |
|---|---|---|---|
| CITY: | ST: | ZIP: | |
| BUS PH: | | RES PH: | |
| AGE: | SEX: | MS: | NUM DEP: |
| OCC CODE: | STATUS: | INCOME RANGE: | TIN: |

| | | | |
|---|---|---|---|
| 11) PHYS DAMAGE | 13) INJURY | 18) HELP | 16) RETURN |
| 12) PROP DAMAGE | 30) LOCAL DATA | 23) LC | |

The Auto-Physical Damage Information screen, shown in Table XI, is used, when necessary, to enter information pertaining to any damage to an insured vehicle. The operator is also prompted to enter a variety of additional information including: incurred loss information, the estimated incurred allocated expense, a repair estimate, etc.

TABLE XI
PHYSICAL DAMAGE INFORMATION

CUSTOMER TEST                                        02 PH 123123

OWNER NAME: CUSTOMER TEST

DESCRIBE DAMAGE TO INSD VEH:

| USED W/PERM? (Y/N): | PURPOSE OF USE: | |
|---|---|---|
| REPAIR EST: | ENTER "X" IF SALVAGE POSSIBILITIES: | |
| WHERE/WHEN VEH CAN BE SEEN: | | |

ATTY (N/R):    NAME:

| CLM DESC CODE: | CLM DESC: | | |
|---|---|---|---|
| LOSS TYPE: | CLM SYM: | COV ID: | TOTAL LOSS IND: |

| EST INC LOSS: | EST INC ALLOC EXP: | VERIFIER: |
|---|---|---|
| PTA: | JIA: | CLAIMS MADE DATE: |

| 1) CLAIM SET-UP | 13) INJURY | 18) HELP |
|---|---|---|
| 6) ADD CLMT | 31) STAT CODING | 23) LC |
| 16) RETURN | 11) PHYS DAMAGE | 30) LOCAL DATA |

The Auto Third Party Property Damage screen, shown in Table XII, is used to enter information relating to any property damaged in the accident. A description of the property, the damage, as well as the estimated incurred loss and other additional information is entered through this screen.

TABLE XII
AUTO THIRD PARTY PROPERTY DAMAGE

CUSTOMER TEST                                        02 PH 123123

OWNER: CUSTOMER TEST
PROPERTY DAMAGE
    DESC OF PROP:

DESC OF DAMAGE:

REPAIR EST:             ENTER "X" IF SALVAGE POSSIBILITIES:
WHERE DAMAGE CAN BE SEEN:

ATTY (N/R):    NAME:
IF DRIVER OTHER THAN OWNER - DRIVER NAME:

OTHER PROP INSD BY:
ENTER "X" IF DED AMT APPLIES:
| CLM DESC CODE: | CLM DESC: | | |
|---|---|---|---|
| LOSS TYPE: | CLM SYM: | COV ID: | TOTAL LOSS IND: |
| EST INC LOSS: | EST INC ALLOC EXP: | | VERIFIER: |
| PTA: | JIA: | | CLAIMS MADE DATE: |

| 1) CLAIM SET-UP | 18) HELP | 30) LOCAL DATA | 16) RETURN |
|---|---|---|---|
| 6) ADD CLMT | 13) INJURY | 31) STAT CODING | 23) LC |

An Injured Party screen is provided to enter information about any party injured in the accident (i.e., description of the injury, disability dates, claim descriptions, etc.). This screen is shown in Table XIII.

TABLE XIII
INJURED PARTY INFORMATION

TABLE XIII-continued

CUSTOMER TEST  02 PH 123123

NAME: CUSTOMER TEST

DESC OF INJURY:
TYPE INJURY CODE:    DIS BEG DATE:    DIS END DATE:
ENTER "X" IF DED AMT APPLIES:    SEAT BELT USE:

ATTY (N/R):   NAME:

CLM DESC CODE:    CLM DESC:
LOSS TYPE:    CLM SYM:   COV ID:   COLL SOURCE IND:

EST INC LOSS:    EST INC ALLOC EXP:    VERIFIER:
PTA:    JIA:    CLAIMS MADE DATE:

| 1) CLAIM SET-UP | 12) PROP DAMAGE | 23) LC | 18) HELP |
| 11) PHYS DAMAGE | 31) STAT CODING | 22) SERVICE PROVIDER | |
| 6) ADD CLMT | 16) RETURN | 13) INJURY | 30) LOCAL DATA |

PACKAGE:   DUPLICATE PAYMENT PROBLEM

A Service Provider screen, (not shown) which may be accessed from the Injured Party Information screen is used to record the names and addresses of the individual(s) or institute(s) that provides medical services to the claimant.

A Claim Set-Up screen, shown in Table XIV, is the final screen of the LPT. Each claim (at least one for each of the asterisked screens on the earlier list) is displayed in summary form, showing the loss type, the claim symbol (an internal processing code), the claimant's name as well as the estimated incurred loss. If more claims are involved than space permits, additional screens will be generated for those remaining.

Routing the incomplete LPT generates a message to the receiving staff member's mailbox to let him know that he should review the incomplete "claim". He, in turn, can then route the unfinished LPT to any other staff member. There is no limit to the number of times this routing can occur.

Editing of the unfinished LPT can be done by actuating certain function keys corresponding to the small "secondary" menu on the bottom of the Claim Set-Up screen. By using the function keys all of the LPT screens can be redisplayed (except the interface screen). When a screen is redisplayed it can be edited in accordance with regular system editing procedures.

TABLE XIV
CLAIM SET-UP SCREEN

SMITH, JOHN                                02 PH 123123

TELEPHONE FIRST REPORT:

| LOSS TYPE | CLM SYM | CLMT NAME | EST INC LOSS |
|---|---|---|---|
| CR | AF | CLAIMANT #1 | 300 |
| CR | AP | CLAIMANT #2 | 450 |
| CP | AC | CUSTOMER TEST | 150 |

| 1) ROUTE-PROCESS | | 10) POLICY INFO | |
| 2) SELECT KEY CLM | 6) ADD CLAIM | 19) SELF REFER | 18) HELP |
| | 7) DESC OF ACC | 25) MODIFY LOSS | 23) LC |
| 17) MORE FUNCTIONS | 9) MODIFY CLMT | 29) VEH-DRIVER | 27) ERASE LPT |

From the Claim Set up screen, the LPT can be completed, routed to another staff member for additional input or review, or edited further. In order to complete the LPT all required fields must be validly filled. If all the required fields are not properly filled, the operator is prompted to correct and/or input the appropriate information. If the operator is unable to complete the required field(s) the LPT will not be completed and the claim number(s) will not be assigned. In such situations, however, pre-determined dummy codes are used to maintain the notice of loss. Alternatively, if other staff members may be able to provide the necessary information, the incomplete "claim" may be routed to them.

Routing the incomplete claim is accomplished by pressing a function key and appropriately completing the Route/Process screen shown in Table XV. (This procedure is discussed in more detail below).

When the Claim Set-Up screen is completed, pressing the appropriate function key activates an Automated Claim Numbering facility. This facility automatically assigns a number, from a pre-determined range, to each claim or record report of the LPT (record reports are given numbers from a separate range from the range of claim numbers.). These numbers are the primary method of accessing individual claims for processing and review.

5. Routing and Assigning Claims

Typically, when all the information available from the notice of loss has been input through the Loss Processing Transaction, the as yet incomplete LPT is routed to a supervisor for review and assignment This routing is done through the Route/Process screen, shown in Table XV. When the initials of a staff member are placed in the "Route To:" field and 'Enter' is pressed, the unfinished LPT is routed to the indicated individual.

TABLE XV

ROUTE-PROCESS SCREEN      LPTX

INSURED, INC.      02 WEC 123123

ROUTE TO: ___    ASSIGN TO: ___    SUPERVISOR: ___

KEY OFFICE CODE: ___

PT: _    NEXT TRANS: ___    DATA CARRY: _

ENTER) ROUTE    2) PROCESS    18) HELP    23) LC    16) RETURN

When the LPT is routed to a staff member he receives a message in his electronic "mailbox". The message comprises a very brief summary of certain information already input into the LPT and indicates who routed the LPT, the reason for the routing (a referral, usually for review in supervisor's case). When the staff member next works on the CAS system, he will be prompted that he has a message waiting (See FIG. 7 steps 114, 124 and 128).

When a supervisor retrieves an unfinished LPT from the database which has been routed to him for review, he typically fills in certain information in the various LPT screens including the estimated incurred loss, the estimated incurred allocated expense, special procedures, etc. The supervisor's input generally completes the LPT. Upon this completion, the supervisor electronically assigns the claim to a particular handler for processing by using a Route/Process screen (see Table XV). When the LPT is complete (complete, meaning all initial information available has been input) and the supervisor assigns the claim, a sequential claim number (or record report number) is automatically generated and assigned by the system to every claim resulting from the loss. (A supervisor in the claims office specifies various ranges of claim numbers to be used by the system through a Number Assignment Transaction screen (not shown)). A claim that has not yet been assigned and given a claim number (or record report number) is considered to be "in-process." When the claim has been assigned and has been given a claim number (or record report number) it is considered to be "processed".

6. Modifying or Augmenting the Loss Processing Transaction Information

Once an LPT has been completed it cannot be altered by merely returning to the original LPT. Thus, to add a companion claim arising out of a previously entered loss a separate function called the Add Companion Claim transaction is provided. All information previously input through the LPT (e.g. description of the accident, etc.) may be viewed in the Add Companion Claim transaction. The Add Companion Claim Select screen, shown in Table XVI, is used to select the claim to which the subsequent companion claim(s) will be added. This screen may be accessed via a Main Menu or by entering 'CCLM' in any 'Next Trans' field.

TABLE XVI

CCLM

ADD COMPANION CLAIM TRANSACTION

ENTER CLAIM NUMBER:

ENTER) CLAIM LIST    18) HELP    32) CANCEL

The Claimant Information screen, the Physical Damage Information screen, the Injured Party Information screen, the Service Provider screen and the Claim Set-Up screen are all available in the Add Companion Claim transaction for the companion claim, just as they were for the original LPT.

A set of LP-Element Change screens are used to add, modify or delete information previously input via the LPT. An LP-Element Changes screen (not shown) is accessed via a Main Menu selection or by entering 'ECHG' in any 'Next Trans' field. Each LP-Element Change transaction is comprised of prefilled screens containing essentially the same fields as the corresponding original LPT screens. Changes are made on a per-screen basis. In other words, information entered via an LPT is redisplayed screen-by-screen for correction of any item on that screen. (See, e.g. Table XVII.)

TABLE XVII

CLAIMANT INFORMATION

BUMSTEAD, DAGWOOD      02 PH 000999

CLAIMANT - ENTER X IF SAME AS INSURED:    (IF NOT ENTER DATA BELOW)

NAME:      P/C:      TITLE:
STREET:
CITY:    ST:      ZIP:
BUS PH:      RES. PH:

AGE:      SEX:    MS:      NUM DEP:

OCC CODE:    STATUS:    INCOME RANGE:    TIN:

TABLE XVII-continued

| | | | |
|---|---|---|---|
| 11) PHYS DAMAGE | 13) INJURY | 18) HELP | 16) RETURN |
| 12) PROP DAMAGE | 30) LOCAL DATA | 23) LC | | p There are two ways to change element information previously input via the LPT.

1. Overlay

The cursor is moved to the desired field location on the display and the original information in that field is typed over. This continues through each succeeding field requiring modification. If the modified information has fewer characters than before, any extra characters may be deleted by erasing to the end of the field.

2. Deletions

This method is used to remove all the information in a field. The cursor is placed in the first character space of the field and the "Erase Key" is pressed. This deletes all the information in the field.

"Control Changes" are changes to any of the following: a claim number, a claimant name, or a policy number. These are essentially fundamental changes which impact the accessibility of the entire loss transaction.

An LP-Control Changes Menu is used to designate the desired control change and claim number (See Table XVIII). First, the entire claim number is entered. Then, the appropriate function key is selected for the Control Change function desired.

By way of example, an LP-Control Changes Claim Number screen is shown in Table XIX. This screen is displayed following the selection of the Claim Number/Record Report Change function on the LP-Control Changes Menu screen. The majority of the information on LP-Control Changes Claim Number screen is pre-filled with the existing control information. However, a field is provided for entry of a new claim number. When the new claim number is entered, this transaction is processed and a comment providing both the old and new claim number is automatically generated to the Activity Log (discussed in detail below).

TABLE XVIII

LP - CONTROL CHANGES MENU

CLAIM NUMBER: ___ _ ____

1) CLAIM NUMBER/RECORD REPORT CHANGE
2) POLICY NUMBER CHANGE
3) DELETE LINKAGE
4) CHANGE LINKAGE
5) CLAIMANT NAME CHANGE

| | | |
|---|---|---|
| 18) HELP | 23) LC | 32) CANCEL |

7. Review of Claim Files

An LPT Inquiry function is used to view claims after they have been processed (through the LPT). The LPT Inquiry transaction, available for viewing purposes only, consists of a series of screens which are essentially the filled screens of the current LPT.

To review any claim using the LPT Inquiry function the claim number must be entered through an LPT Loss Inquiry screen shown in Table XX. The LPT Loss Inquiry screen is accessed via the Main Menu or by inputting 'LPTI' in the 'Next Trans' field of any transaction.

TABLE XIX

LP - CONTROL CHANGES

CLAIM NUMBER

| | | | |
|---|---|---|---|
| INSURED: | JOHNSON, RICHARD | P/C: P | TITLE: MR |
| | CLAIMANT: JONES, PETER | P/C: P | TITLE: MR |
| | POLICY NUMBER: | 02 PH 120000 | |
| | CLAIM NUMBER: | 023 AP 00103 | |
| | NEW CLAIM NUMBER: | ___ _ ____ | |

LOCAL ONLY UPDATE: ___ PT: ___ PTA: ___ NEXT TRANS: ___
DATA CARRY: ___

| | | | |
|---|---|---|---|
| ENTER) CHANGE CLAIM | 23) LC | 18) HELP | 32) CANCEL |

A loss Assignment/Inquiry—Claim Summary screen, shown in Table XXI, is displayed in response to the entry of the claim number in the LPT Loss Inquiry screen. This screen lists all

TABLE XX

LOSS INQUIRY

CLAIM NUMBER: 023 AC 13131

| | |
|---|---|
| ENTER) VIEW INFORMATION | 16) RETURN | claims associated with the claim number entered (i.e. the claim requested and all companion claims). Positioning the cursor next to the desired claim and pressing 'Enter' displays a filled Claim Information screen. From the Claim Information screen it is then possible to review filled screens from the current LPT.

Table XXII, is an example of one of the HTC Received screens with the addition of the claim number field and

TABLE XXI
AUTO LOSS ASSIGNMENT/INQUIRY SUMMARY SCREEN

```
INSURED: DARBY ENTERPRISES
         300 COMPOSER AVENUE
         WEST HARTFORD    CT 06102        BUS PH: (203) 528-8888
POL NUM: 37 DP 100111    AGENCY:          RES PH:
CLM DESC:                                         WITNESS: N
LOSS DATE: 08/01/88    TIME OF LOSS: 06P  REPORTED DATE:
TELEPHONE FIRST REPORT:
CLAIM NUMBER         CLAIMANT             EST INC LOSS    HAND/SUPV
023 AC 13131         DARBY ENTERPRISES        2,000       RRD/CGM
                     300 COMPOSER AVENUE
                     WEST HARTFORD CT 06102   BUS PH: (203) 528-8888
                                              RES PH:

023 Ac 13132         JOHN DALEO               BUS PH:
                     258 CONCORD DR.          RES PH:
                     POTTSTOWN, PA 19464

ENTER) SELECT CLAIM    7) SELECT CLAIMANT    12) ADD DIARY ENTRY
  16) RETURN           4) PREV CLAIM         10) POLICY INFO
  14) ACTIVITY        17) NT                  5) NEXT CLAIM
  11) DESC OF ACC     29) VEH-DRIVER         23) LC
```

8. Transfer of Claims Between Claims Offices

Claims initially received, set-up, and numbered in one office may need to be transferred to another office to Handle to Conclusion (HTC) due to a change in the claimant's or insured's address (or other change in location). To do this, the originating office completes an HTC Sent transaction, through CAS, and electronically transfers the claim file to the new claims office.

the sending office field (marked with asterisks).

A "Service Item" is a request by one claims office to another claims office for a partial investigation of a claim that is being handled by the first claim office. Such requests can include obtaining a police report, a signed statement, etc. A Service Item request may be mailed or electronically transferred to a receiving office. If the request is mailed it must be manually input into the CAS System via a Service Item

TABLE XXII
PHYSICAL DAMAGE INFORMATION

```
BURMINGHAM, TED                                      12 MKZ 030889

OWNER NAME: BURMINGHAM, TED
NUMBER: *                                            OFFICE: *
DESCRIBE DAMAGE TO INSD VEH:

USED W/PERM? (Y/N):                   PURPOSE OF USE:
REPAIR EST:                           ENTER "X" IF SALVAGE POSSIBILITIES:
WHERE/WHEN VEH CAN BE SEEN:

ATTY (N/R):            NAME:

CLM DESC CODE:         CLM DESC:
LOSS TYPE:             COV ID:            TOTAL LOSS IND:

EST INC LOSS:          EST INC ALLOC ESP:      VERIFIER:
CLAIMS MADE DATE:

1) CLAIM SET-UP   11) PHYS DAMAGE   18) HELP   16) RETURN
 6) ADD CLMT       13) INJURY        23) LC     30) LOCAL DATA
```

The HTC Received Transaction screens are almost identical to the LPT screens and follow the same screen flows and completion procedures. The difference between the HTC Received screens and the LPT screens is the addition of a claim number field, a sending office field and the removal of the claim symbol field as a separate field. For example, for the automobile line of business LPT, the additional fields appears on the Physical Damage Information screen, the Auto Third Party Property Damage screen and the Injured Party Information screen.

When the HTC Received transaction is accessed, an Interface screen returns which is identical to the LPT Interface screen and follows the same completion procedures and subsequent screen flows. Shown below in transaction. If the request is transferred electronically, the Service Item transaction screens prefill. In such cases, when the Service Item request is received it goes to a predesignated supervisor's mailbox for review and assignment. The Service Item transaction screens (not shown) are similar to the LPT screens and follow the same screen flows and completion procedures. The difference between the Service Item screens and the LPT screens is that not as much information is required for processing a Service Item and the Service Item screens contain fields for recording Requesting Office information (e.g. name, code, etc).

9. Staff Tables

The Staff Tables function maintains information relevant to the claim office personnel. This information includes authority level, case load maximum, job title, etc. for each staff member. Supervisors determine the proper reserve authority level, payment authority level, diary limit, case load amount, etc. for each staff member. Only claim office personnel having the proper authority are able to view, update, and or delete information on the Staff Tables.

When a new staff member needs to be added to the staff tables a screen entitled Valid JDC-AMC Combinations, show in Table XXIV, is typically accessed first. This screen is a prefilled table of job descriptions applicable to a claim office. By positioning the cursor on the appropriate job description and pressing "Enter" the selected job description pre-fills into an Add Staff Member screen. This Add Staff Member screen is used to input the various authority levels, system IDs and other information regarding the new staff member. (See Table XXV).

TABLE XXIV
VALID JDC - AMC COMBINATIONS

| JOB DESCRIPTION CODE | ADJUSTMENT METHOD CODE | JOB DESCRIPTION |
|---|---|---|
| BA | 1 | GENERAL ADJUSTER |
| HSR | 1 | HEALTH SERVICES REP |
| OCR | 1 | OUTSIDE CLAIM REP |
| OCS | 1 | OUTSIDE CLAIM SPECIALIST |
| OSR | 1 | OUTSIDE SENIOR CLAIM DEP |
| RCR | 1 | RESIDENT CLAIM REP |
| CP | 2 | CLAIM PROCESSOR |
| ICR | 3 | INSIDE CLAIM REP |
| ICS | 3 | INSIDE CLAIM SPECIALIST |
| ISR | 3 | INSIDE SENIOR CLAIM REP |
| TCR | 3 | TELEPHONE CLAIM REP |
| CA | 4 | CLAIM ASSISTANT |
| OSU | 4 | OFFICE SERVICES UNIT |
| SA | 4 | SYSTEM ADMINISTRATOR |

6) ADD STAFF MEMBER  18) HELP  23) LC
5) NEXT/LAST  32) CANCEL

When the Staff Table function is accessed, the operator can: view a particular staff member's table; add staff members to the staff directory; search for a particular staff member; or modify information on the Staff Table. The ability to perform any or all of these functions is entirely dependent on the operator's Staff Table authority. To view all the members of the staff a Staff Directory screen (shown in Table XXIII) is available. This directory will display on multiple screens, if necessary, depending on the number of staff members.

In order to view, modify or delete a particular staff member's table, the cursor is placed next to the name of that staff member and 'Enter' is pressed. Alternatively, a Find Staff Member screen (not shown) is available for directly accessing a particular staff member's screen. All that is necessary is to input that individual's initials or last name.

When a supervisor wishes to check on authority levels and/or other parameters for a staff member, a Staff Member Inquiry screen can be accessed to view the current settings. This screen

TABLE XXIII
STAFF DIRECTORY

| LAST NAME | FIRST NAME | INITIALS | JDC |
|---|---|---|---|
| ANDERSON | SUSAN | SAA | GA |
| ANDREWS | ANNE | AOA | ASR |
| ASHTON | PAULA | PXA | SA |
| BALD | LISA | LLS | ICR |
| BARNES | DWAYNE | DJB | SA |
| BARR | DAVID | DKB | OCR |
| BARR | ROBIN | RSB | CA |
| BARR 2ND | ROBIN | RB1 | OCR |
| BEARSE | ELIZABETH | EJB | OSU |
| BECKER-JONES | PAM | PBJ | OCR |
| BECKLES-MITCHELL | BRENDA | BAM | IND |
| BELISLE | JOANNE | JAB | CP |
| BELL | ANNE | ALB | CA |
| BENSON | RON | RAB | 999 |

ENTER) INQUIRE  6) ADD  9) MODIFY  16) RETURN  8) DELETE
5) NEXT/LAST  7) FIND  18) HELP  23) LC

TABLE XXV
ADD STAFF MEMBER

STAFF TABLE FOR:
LAST NAME:

TABLE XXV-continued

| | |
|---|---|
| FIRST NAME: | |
| LOGON ID: | |
| JOB TITLE: | |
| UNIT: | UNIT NUMBER: |
| AMC: | DEFAULT MENU NUMBER: |
| JOB DESCRIPTION CODE: | STATE LICENSE NUMBER: |
| SUPERVISOR: | ALERT MSG REC: |
| PAYMENT AUTHORITY: | TRANS REVIEW: |
| RESERVE AUTHORITY: | |
| OUT OF OFFICE: TO | ABSENCE TYPE: (S-T-V) |
| CASELOAD/NEW ASSIGNMENTS: | CASELOAD OUTSTANDING: |
| DIARY LIMIT PER DAY: | |
| GENERATE SUPV DIARY - COMPENSATION: | "ALL OTHERS": |
| DIARY ROLLOVER LIMIT - DAILY: | PER CLAIM: |
| STAFF TABLE AUTHORITY: (A-B-C-D-E) | TERMINATION/TRANSFER DATE: |
| OTHER TABLE AUTHORITY: (Y-N) | PRIMARY OFFICE CODE: |
| AUTHORIZER: | UPDATER: NEXT TRANS: |

ENTER) ADD     13) VALID ADMINISTRATIVE UNITS     23) LC
32) CANCEL     18) HELP is shown in Table XXVI.

Additional screens are available within the Staff Tables function to modify staff member information and to delete staff members from the file.

The Staff Table function and the Staff Tables created through that function are an extremely important piece of the CAS system. The Staff Tables are integrated with virtually every other function in CAS. For instance, before an operator can even access CAS functions, the User ID which has been input is

TABLE XXVI
STAFF MEMBER INQUIRY

| | |
|---|---|
| STAFF TABLE FOR: AOA | |
| LAST NAME: ANDREWS | |
| FIRST NAME: ANNE | |
| LOGON ID: AA 6646 C | |
| JOB TITLE: SYSTEM ADMINISTRATOR | |
| UNIT: AU/CHU | UNIT NUMBER: 03 |
| AMC: 8 | DEFAULT MENU NUMBER: 01 |
| JOB DESCRIPTION CODE: ASR | STATE LICENSE NUMBER: |
| SUPERVISOR: JFM | ALERT MSG REC: EWW |
| PAYMENT AUTHORITY: | TRANS REVIEW: N (Y/S/N) |
| RESERVE AUTHORITY: | |
| OUT OF OFFICE: TO | ABSENCE TYPE: (S-T-V) |
| CASELOAD/NEW ASSIGNMENTS: | CASELOAD OUTSTANDING: |
| DIARY LIMIT PER DAY: | |
| GENERATE SUPV DIARY - COMPENSATION: | "ALL OTHERS": |
| DIARY ROLLOVER LIMIT - DAILY: | PER CLAIM: |
| STAFF TABLE AUTHORITY: A (A-B-C-D-E) | TERMINATION/TRANSFER DATE: |
| OTHER TABLE AUTHORITY: Y (Y-N) | PRIMARY OFFICE CODE: 515 |
| AUTHORIZER: RAB | UPDATER: DML    NEXT TRANS: |

ENTER) NT     18) HELP     16) RETURN     23) LC compared to the staff initials specified in the Staff Tables. If no match is found, the operator will not be able to access any CAS functions. Once the operator has successfully logged on, the System Controller must look to the Staff Tables to display the proper Primary Default menu which is indicated in the Default Menu Number field of the user's Staff Table. Still further, the Staff Tables are referenced to properly route alert messages, to limit function access, to limit payment and reserve activities, to prefill operator information for Activity Log entries and to specify when diary and authority level alert messages will automatically be generated. In each of these cases, the Staff Tables are referenced to insure the proper operation of other system functions which are user specific.

Another available function, which is a derivative of the Staff Tables, is the Caseload Monitoring function. This function can produce a series of reports which permit supervisors and other claim office managers to monitor the case loads of individual staff members, claim units and the office as a whole. This series of reports can include information such as monthly claim openings and closings, the number of claims handled by line of business, and total caseload counts. The Caseload Monitoring function can also provide a Current Claim Distribution report. This report, which can be done by individual staff member, claim unit or the entire office, shows the number of claims of a specific monetary range which are being handled. This is an important management tool since higher valued claims generally require substantially more time and effort to complete.

10. Directory Tables

The Directory Tables function is used to store and display names, addresses and other pertinent information about currently used services and individuals. These include attorneys, doctors/hospitals, investigating authorities, etc. Each listing in the directory tables is automatically assigned a unique directory code upon initial input. (The code includes a category designation so that, for example, a list of defense attorneys can be readily displayed.) The Directory Tables function then interacts with various other functions including the LPT, Payment and TEXT Processing functions to prefill the name and/or address information when the directory code is input into one or more fields on these screens.

When the Directory Tables function is accessed the first screen which is displayed is the Directory Tables List screen, shown in Table XXVII. This screen is a listing of entries in the Directory Tables. (The Directory Tables List screen will automatically display the appropriate category of entries for filling in certain empty text fields during Text Processing. In such cases placing the cursor on the correct listing and actuating the correct function key will fill in the blank field.) In order to access all the information associated with the entry, the cursor can be placed next to the entry and 'Enter' pressed. A Directory Table Display screen, shown in Table XXVIII, then appears displaying the information applicable to the particular entry. Alternatively, a Directory Tables Inquiry screen, shown in Table XXIX, can be used to search for the particular entry.

TABLE XXVII
DIRECTORY TABLES LIST SCREEN

| CODE | NAME | P/C | TITLE |
|---|---|---|---|
| A 00001 | LASSERMAN, TAMMY E. | P | MS. |
| A 00002 | D'ANGELO & D'ANGELO, LAW OFFICES OF | P | |
| A 00003 | KARSH, DIANNE | P | MS. |
| A 00004 | STEVENSON, JACOBS & ROSE PC | C | |
| A 00005 | JOHNSON, DAVID LEE | P | MR. |
| A 00006 | JOHNSON, DAVID LEE | P | MR. |
| A 00008 | GILLEY, HINKEL & BROWNE, ATTYS AT LAW, PC | C | |
| A 00008 | JAMESON, HENRY | P | MR. |
| A 00009 | FOY, MICHAEL | P | ATTY |
| A 00010 | LINCOLN, WASHINGTON, ROOSEVELT & KENNEDY, PC | C | |
| A 00013 | ROGERS & ROGERS PC | C | |
| A 00015 | HURLEY, MARY | P | MS. |
| A 00016 | WALBACK AND WALBACK PC | C | |

ENTER) DISPLAY 4) PREV/FIRST 6) ADD 8) DELETE 16) RETURN
                  5) NEXT/LAST 7) FIND 9) MODIFY 17) NT
                                     23) LC 18) HELP

TABLE XXVIII
DIRECTORY TABLES DISPLAY SCREEN

CODE: A 00036                    P/C: C

NAME: PEARSON, BAUK & WEINSTEIN

TITLE: ATTY
STREET: 1000 FARMINGTON AVENUE
(OPTIONAL):
CITY: HARTFORD
STATE: CT
ZIP CODE: 06115
TELEPHONE: (203) 548-0011

TABLE XXVIII-continued

TIN:
TR CODE:
                           NEXT TRANS:

16) RETURN     17) NT     18) HELP     23) LC

TABLE XXIX
DIRECTORY TABLES INQUIRY SCREEN

SEARCH ON

CODE:
NAME:

ENTER) LIST     18) HELP     32) CANCEL

To add an entry to the Directory Tables, a Directory Tables Add screen, shown in Table XXX, is available. When the input fields have been filled and the 'Enter' key is pressed, the new entry becomes part of the Directory Tables list.

TABLE XXX
DIRECTORY TABLES ADD SCREEN

CODE:                         P/C:
NAME:
TITLE:
STREET:
(OPTIONAL):
CITY:
STATE:
ZIP CODE:
TELEPHONE:
TIN:
TR CODE:
NEXT TRANS:

ENTER) ADD   18) HELP   23) LC   32) CANCEL   3) ACCEPT DUPLICATE

Additional screens (not shown) are also provided to delete and modify individual entries. The screen structure and format is very similar to that used for the Staff Tables function.

11. Info Search

The Info Search Facility provides the ability to search for information resident on the local data base (on-line) as well as data that has been purged to an off-line database. Info Search will access both "in process" and "processed" claims.

The Info Search Facility screen, shown in Table XXXI is accessed via a Main Menu selection or by entering 'SRCH' in the Next Trans' field of any transaction. The Info Search Facility performs searches by using any of the following criteria: (1) claim number; (2) claimant name; (3) insured name; and (4) policy number. One or more of these pieces of information may be input through the Info Search Facility screen. If exact spellings of names are not known, phonetic translation, a technique that puts a similar sounding or spelled name/text to a numeric equivalent or phonetic key, is used by the System to assist in the location of the records. If the entire name is not known, the system will also search on a partial name. To further restrict the search and limit the number of records returned, additional information about the claim(s) can be input through the Info Search Facility screen (such as loss date, insured address, claimant address, etc.)

A Select Applicable Insured Information screen (not shown) is displayed when the insured name is searched through the Info Search Facility screen and multiple records are found. Similar screens are available when claimant information is used as the search basis.

TABLE XXXI
INFO SEARCH FACILITY

INSURED:

CLAIMANT:

CLM NUMBER: POL NUMBER:

IF KNOWN, ENTER THE FOLLOWING INFORMATION:

LOST DATE: SEEK TERM: THRU

INSURED ADDRESS: ST: ZIP:
CLAIMANT ADDRESS: ST: ZIP:

ENTER "X" IF OFFLINE SEARCH:

ENTER) SEARCH  10) NAME EXACT MATCH  18) HELP  23) LC  16) RETURN

Once the desired claim is found, the operator may acquire further detailed information by accessing the Activity Log or the LPT Inquiry function (to determine the nature of the claim) screens from the Claim Information screen or by pressing a 'Next Trans/Data Carry' function key and placing the appropriate code in the 'Next Trans' field to access any other function.

Off-line Information is displayed in the same manner through separate Off-Line Claim Information screens (not shown).

11. Activity Log

The Activity Log is a record of the key activities involved in the processing and adjustment of a claim. The Activity Log is created in one of two ways. A claim handler, supervisor or other staff member can create an Activity Log via input of a claim number to an Activity Log Select screen shown in Table XXXII (This screen is also used to access an existing Activity Log). Alternatively, the system will create an Activity Log automatically, if one does not already exist, when an operator moves directly to the Activity Log function for a specific claim. If another CAS transaction generates a comment to the Activity Log and the Log does not already exist, it will likewise be automatically created.

An Activity Log Comments screen, shown in Table XXXIII, is pre-filled and displays all comments presently in the Activity Log. There is no limit to the number of Comments screens in an Activity Log. The screens within the Activity Log are displayed in reverse chronological order allowing the operator to view the most recent entries to the Log first.

TABLE XXXII
ACTIVITY LOG SELECT

CLAIM NUMBER:

ENTER) ACTIVITY LOG  18) HELP  16) RETURN  23) LOCAL COPY

The Activity Log Add screen shown in Table XXXIV is used to add a comment to an Activity Log.

Any time an entry is made to the Activity Log, the claim number, insured name, claimant name, loss date, claim description and estimated incurred loss fields are pre-filled. All these fields are protected and cannot be

TABLE XXXIII
ACTIVITY LOG COMMENTS

CLM NUM: 023 C 00002    CLMT: BAILEY, BILL

INSD: STRADLIN, IZZY    LOSS DATE: 03/03/89
CLM DSC:    EST INC LOSS: 250

HAND: LLB    SUPV: RJM    INITIAL RESERVE: 250

03/03/89    JACKET INDEX NON SCAN - DLSA:

03/03/89    JACKET INDEX NON SCAN - DLSC:

| | | | | |
|---|---|---|---|---|
| 6) ADD COM | 10) INDEX | 14) POL LIMITS | 17) NT | 16) RETURN |
| 7) SELECT | 12) DIARY FUNCTN | 15) DIARY LIST | | |
| 18) HELP | 23) LC | 19) PAYMENT COM | | | modified by the operator. When a comment is automatically generated to the Activity Log, these fields are likewise prefilled and protected. In fact, every field in the Activity Log is protected once an entry has been made. This provides an audit trail for any necessary claim review.

An Activity Log Index screen, shown in Table XXXV, is provided to show the general status of a claim and serves as an index to multiple claims of a particular loss occurrence. The Activity Lot Index screen, which is prefilled, can be used to select the desired claim by positioning the cursor next to the claim number and pressing the appropriate function key.

TABLE XXXIV
ACTIVITY LOG ADD

CLM NUM: 023 C 00002    POL NUM: 00 GNR 010101
INSD: STRADLIN, IZZY
CLMT: BAILEY, BILL    LOSS DATE: 03/03/89
CLM DSC:    EST INC LOSS: 250

03/07/89
LAE    _____
       _____
       _____
       _____
       _____
       _____
       _____
       _____
       _____
       _____

6) ADD COMMENT    18) HELP    23) LC    32) CANCEL

Within the Activity Log function, a Modify screen (not shown) is available to modify or input the Destroy Date, the Coverage Requested Date, the Coverage Received Date and the Comment field of the Activity Lot Index. This information may appear pre-filled if these dates or comments were previously entered or generated. If the fields are pre-filled, they can be modified by overlaying the information. If there are no pre-filled dates or comments, the correct date or comment can simply be added in the blank field.

TABLE XXXV
ACTIVITY LOG INDEX

INSURED: STRADLIN, IZZY
POL NUM: 00 GNR 010101    LOSS DATE: 03/03/89    DESTROY DATE:
COV REQ:    COV. REC:
OCC RESERVE: 250    POLICY STATUS:    LAPSE STATUS:
COMMENTS:

| CLAIM NUMBER | CLAIMANT | EST INC LOSS | STATUS |
|---|---|---|---|
| 023 C 00002 | BAILEY, BILL | 250 | 0 |

ENTER) ACTIVITY LOG    9) ADD/MODIFY    18) HELP

TABLE XXXV-continued

| 16) RETURN | 14) POL LIMITS | 23) LC |
|---|---|---|

An Activity Log Payment Comments (not shown) is available for viewing. This screen is pre-filled and displays all payment comments which have been automatically generated to the Activity Log. This provides a quick, efficient way to evaluate a claim's payment record.

13. Claim Reassignment

There are three types of reassignment transactions: claim; family; and global. A Claim Reassignment transaction is available through a Claim Reassignment screen (not shown) to reassign a single new claim to a different claim handler and/or supervisor. A Family Reassignment transaction is available through a Family Reassignment screen (not shown) which is used to reassign a family of claims to a new/different claim handler and/or supervisor. Lastly, a Global Reassignment transaction is available to reassign all open claims from one claim handler and/or supervisor to another claim handler and/or supervisor. The latter is accomplished through a Global Reassignment screen (not shown). This transaction requires a high security level and can only be undertaken by certain staff members.

14. Claim Status Changes

A Claim Status Change function is used when one of the following activities is required on a claim file: (1) close a claim when no closing check is being issued at the time of the closing; (2) reopen a closed claim that is to remain open; or (3) change the reserves on an open claim.

A Claim Status Change Menu, shown in Table XXXVI, lists each of the Claim Status Change transactions available for selection. A Claim Status Changes Claims Select screen (not shown) is used to enter the claim number for which a change is required. This screen is displayed after selection of an type of Claim Status Change through the Claim Status Change menu screen.

TABLE XXXVI

CLAIM STATUS CHANGES

PRESS A PF KEY BELOW OR RETURN TO DO NEXT TRANS:

1) CLAIM STATUS CHANGE - CLOSE
2) CLAIM STATUS CHANGE - REOPEN
3) CLAIM STATUS CHANGE - RESERVE

16) RETURN TO PREVIOUS MENU
32) LOGOFF

Either a Claim Status Change-Close Transaction or a Final/Close Payment transaction is required to close a claim. If a Final/Closed Payment check is issued, the Closing Payment transaction will close the file. If the claim is being closed without a payment, the Claim Status Change-Close transaction must be used to close the claim. A Claim Status Change-Close screen, shown in Table XXXVII, is accessed from the Claim Select screen after the selection of "Claim Status Change-Close" n the Claim Status Changes Secondary Menu.

There are two types of claim reopenings. They are: (1) reopen/close to issue a payment and to close the claim again in one transaction using a Payment Reopen/Close transaction; and (2) a

TABLE XXXVII

CLAIM STATUS CHANGES - CLOSE

CLAIM NUMBER: 023 L 00003     POLICY NUMBER: 02 SCC777777
INSURED: THE DUPONT CORPORATION
CLAIMANT: JERKINS, HARRY     CLAIMANT STATUS:

LOSS PAID: 0.00     ALLOCATED EXPENSE PAID: 0.00

SUBROGATION EXPENSE: 0.00     SALVAGE EXPENSE:
REFUND EXPENSE:

CLAIM ACTION CODE: 0     SUIT RESULT CODE:
COLLATERAL SOURCE/TOTAL LOSS IND:

DISABILITY BEGINNING DATE:     DISABILITY ENDING DATE:

LOCAL ONLY:     DESTROY DATE:

PTA:     NEXT TRANS:     DATA CARRY:

2) PROCESS    18) HELP    23) LC    30) LD    32) CANCEL reopen that is to leave the claim open using a Claim Status Change-Reopen transaction. A regular Payment transaction is used to reopen and close a claim if an additional payment is made and the claim does not need to remain open.

A Claim Status Changes-Reopen transaction is required to reopen a claim which will remain open. The loss type will remain the same as it is when the claim was closed. A Claim Status Change-Reopen screen, shown in Table XXXVIII, is used to perform this transaction. If the closed claim is not found using the On-Line Info Search Facility the Off-Line Info Search Facility is used.

TABLE XXXVIII
CLAIM STATUS CHANGES - REOPEN

CLAIM NUMBER: 023 L 00003    POLICY NUMBER: 02-SCC 777777
         INSURED: THE DUPONT CORPORATION
         CLAIMANT: JERKINS, HARRY

|  | EST INC | PAID |
|---|---|---|
| LOSS: | 0 | .00 |
| ALLOCATED EXPENSE: | 0 | 0.00 |
| LOSS VERIFIER: | 0 | |

DISABILITY BEGINNING DATE:    DISABILITY ENDING DATE:

LOCAL ONLY:    ASSIGN TO:    SUPERVISOR:

PTA:    NEXT TRANS:    DATA CARRY:

2) PROCESS    18) HELP    23) LC    30) HOLD    32) CANCEL

A Claim Status Changes-Reserve Change transaction is required to change the estimated incurred loss and/or estimated incurred allocated expense on open claims (The estimated incurred allocated expense is the amount of money that is expected to be spent by claims office for investigation of a claim). When a Reserve Change is processed, a comment is automatically generated to the Activity Log. A Claim Status Changes-Reserve Change screen, shown in Table XXXIX below, is used to complete this transaction. The claim number, policy number, insured and claimant name fields will pre-fill with the previously entered information. The Initial Reserve field will pre-fill with the original that was entered in the LPT and the Estimated Incurred and Paid fields will prefill with the most current totals.

TABLE XXXIX
RESERVE CHANGE

CLAIM NUMBER: 023 L 00003    POLICY NUMBER: 02 SCC 777777
         INSURED: THE DUPONT CORPORATION
         CLAIMANT: JERKINS, HARRY

INITIAL RESERVE: 1,200

|  | EST INC | PAID |
|---|---|---|
| LOSS: | 0 | .00 |
| ALLOCATED EXPENSE: | 0 | .00 |
| LOSS VERIFIER: | 0 | |

LOCAL ONLY:    ASSIGN TO: MKZ    SUPERVISOR: CGM

PTA:    NEXT TRANS:    DATA CARRY:

2) PROCESS    18) HELP    23) LC    30) LD    32) CANCEL

15. Text Processing

The Text Processing function provides the ability to perform various types of text processing without leaving the CAS system. Text Processing can generate preformatted documents and pre-fill blank fields in the documents' bodies by extracting information input through other system functions. Upon operator request, all applicable information, previously input into CAS via other transactions (e.g. LPT) is pre-filled into the requested document. In the event that all the information necessary for form completion cannot be extracted from the system, the Text Processing function prompts the operator to manually input the additional information.

A core group of generic forms are preformatted for use in all claims offices. However, each claims office can customize its own forms. This customization requires the creation of a form in "Word Processing" (A Word Processing function is provided with Wang ® brand equipment, however, this function is available with virtually every other available system. The Word Processing function is generally accessed through a "Wang ® Office" menu selection.) After the form is created it is brought within the Text Processing function where it is coded so that all blank fields will prefill. Thus, a local claims office is not constrained by the preformatted forms.

A Document Claim Selection screen (not shown) is used to select the claim(s) for which documents are needed. A Document Claim Request screen, (not shown) is used to select the particular claim for which correspondence is desired. A Document Request screen, shown in Table LX, displays a list of preformatted documents applicable to the selected claim. From this screen an operator may select the specific form(s) to be printed. Only those documents appropriate for the type of claim which has been input are listed. If multiple claims are selected for correspondence generation, form lists are displayed one at a time for each claim.

Text Processing pulls applicable information from within the system and pre-fills as many fields requiring completion as possible. If all the required fields are completed and if a particular designation is made (i.e. placing an 'X' in the 'X OR V' field), the system automatically sends the document to the appropriate print queue. If the system is unable to pre-fill all of the fields, the requester is prompted to input the necessary information via a Directory Completion screen (if the information is contained in a directory table) or with a Document Completion screen (if the information is not contained anywhere in the system).

The Directory Completion Screen, shown in Table XLI, is associated with the Directory Tables function. It lists the appropriate type of Directory entries (e.g. all Doctors, or all investigators, etc.) for the particular empty field. If a designation is made (i.e. placing a 'V' in the 'X OR V' field) the system will display the Document Completion screen (even if the document is 100% completed) so that the requestor may view, modify and/or complete the document prior to sending it to the print queue. Each Document Completion screen is unique for each specific document. Any blank fields displayed on the Document Completion screen are those which the system was unable to complete with the available system information. Fields which are necessary in order to generate the document, are highlighted and underlined. A document cannot be sent to the print queue if a required field is blank. Ultimately, if a required field cannot be filled, the document request must be cancelled.

Some forms are generated automatically without any operator intervention. This may occur, for example, when an LPT is processed, or when certain LPT screens are completed and a form is generated to provide system or legal backup for the loss notice. If the system reaches an automatic form generation point, and the necessary information to send the form to the Text Processing Print queue is unavailable, an alert message is generated.

The CAS system also supports the preparation of free form documents through the Word Processing function, as indicated previously. This permits an operator to type any letter or form that is needed. The usual edits are available to permit the revision of any errors.

TABLE XL

DOCUMENT REQUEST SCREEN

CLAIM NUMBER: 023 AC 00001  LOSS DATE  04/19/89
INSURED: SMITH, JOHN
CLAIMANT: SMITH, JOHN

| (X OR V) | DOCUMENT NAME | HANDLING INSTR |
|---|---|---|
| * | CP-16 CLAIM RECOVERY ESTIMATE - | * |
| * | ACKNOWLEDGE AND REQUEST FOR INFO | * |
| * | FILE TRANSFER | * |
| * | ACKNOWLEDGE OF CLM -NO INFO ML-10 | * |
| * | ASR ASSIGNMENT SHEET INSD AUDTX | * |
| * | ADR-ML 11 | * |
| * | APP BENEFITS AUTO/PROP LC-5069-1 | * |
| * | ACKNOWLEDGEMENT LETTER TO AGENT WTCHR | * |
| * | ASR ASSMT SHT INSD NON-AUDA - DLSA | * |
| * | ATTORNEY ACKNOWLEDGEMENT | * |
| * | ASR ASMT SHT-CLMT - AUDA LC 5344 | * |
| * | CLAIM FOR DAMAGES LC-2474 | * |
| * | ASR ASMT SHT-INSD - AUDA LC 5344 | * |
| * | CLAIM FOR DAMAGES PROPERTY LC4556 | * |

ENTER) SELECT    4) PREV SCREEN    16) RETURN
                 5) NEXT SCREEN    18) HELP

TABLE XLI

DIRECTORY TABLE

POSITION CURSOR AND PRESS ENTER FOR DESIRED SELECTION:

- EASTON, ELIZABETH
- MIDDLESEX MEMORIAL HOSPITAL
- HARTFORD HOSPITAL
- PATTERSON, IRVING
- IRVINGTON, JAMES
- DAVIDS, JOHN
- BROWN, ALFRED
- BANKS, SUSAN
- BRIGHAMS, SAMUEL
- JACKSON, CARMEN
- PALMER, DOROTHY
- ST. FRANCIS HOSPITAL
- RIVERVIEW HOSPITAL

TABLE XLI-continued

SMITH, FRANKLIN

ENTER) SELECT RECORD   16) RETURN   5) NEXT/LAST   18) HELP

16. Print Queues

There are two main output facilities available through CAS. They are the LOHC (Local Output Hold Control) facility and the Text Processing Print Queue. (Local Copy is available to print out single screen transactions or to print out one screen of a multi-screen transaction. Local copy is sent to the designated printer (without LOHC intervention)).

As indicated above, the Text Processing function provides the means for the selection and completion of the majority of the claim office forms and letters. All documents are complete coming off the printer. Some documents are ready for mailing immediately after printing. However, multipart forms need to be torn apart and distributed. Depending upon office structure, an output operator generally pulls all text processing output and mails or completes the "processing" of the output.

Depending on the form, a document request is also sent to a mail print queue or a file print queue or both. After documents are sent to one or both of these print queues, the request for document printout is initiated, as described above, via the print queue facility. A Document Summary Mail Print Queue screen, shown in and any special handling instructions. A Document Summary File Print Queue screen (not shown) is also provided to give an overview of the documents to be printed and filed. Again, documents are listed by group and number of documents requested along with any special handling instructions.

A number of Detail Queue screens (not shown) reformat the summary information of the Document Summary Mail and File Print Queues into detailed columns that list:
1) claim number;
2) document name;
3) group;
4) request date; and
5) user ID.

For example, the Detail Queue by Claim Family screen shown in Table XLIII, displays all requested documents for the applicable claim family. The documents displayed are listed in claim number order.

The Local Output Hold Control facility (LOHC) is an electronic storage facility designed to hold information which is waiting to be printed as a result of a transaction input to the local database. There are a number of types of output printed from LOHC including Print Transactions, Transaction Logging and a

TABLE XLII

DOCUMENT SUMMARY MAIL PRINT QUEUE

| | GROUP | NAME | TOTAL DOCUMENTS | HANDLING INSTRUCTIONS |
|---|---|---|---|---|
| _ | BLKSTK | BLANK STOCK (SHEET FEED) | 4 | |
| _ | BLKSTK | BLANK STOCK (SHEET FEED) | 2 | A |
| _ | BLKSTK | BLANK STOCK (SHEET FEED) | 2 | R |
| _ | LTRHED | LETTERHEAD | 2 | |
| _ | LTRHED | LETTERHEAD | 6 | A |
| _ | LTRHED | LETTERHEAD | 6 | R |

1) PRINTED DOCUMENTS   6) FILE QUEUE   16) RETURN   8) DELETE
                       17) DETAIL QUEUE   15) PRINT   18) HELP

TABLE XLIII

DETAIL QUEUE BY CLAIM FAMILY

| | CLM NUMBER | DOCUMENT | GROUP | REQ DATE | UID |
|---|---|---|---|---|---|
| _ | 033 00110 | MEDICAL REQUEST TO DOCTOR | LTRHED | 07/08/87 | RAB |
| _ | 033 00110 | MEDICAL REQUEST TO DOCTOR | LTRHED | 07/08/87 | RAB |
| _ | 033 00112 | REQUEST FOR POLICE REPORT | LTRHED | 07/08/87 | RAB |
| _ | 033 01112 | DEDUCTIBLE RECEIVED LTR PRATE | LTRHED | 07/08/87 | MGR |
| _ | 033 00112 | DEDUCTIBLE RECEIVED LTR PRATE | LTRHED | 07/08/87 | MGR |

8) DELETE      10) DATE REQ SORT   15) PRINT
16) RETURN     9) REQ SORT         11) GROUP SORT   18) HELP

Table XLII, provides an overview of the documents to be printed and mailed. Documents are listed by group (paper type) with the number of documents requested variety of system reports. The Print Transaction, when requested, generates a hard copy of selected processed (completed), multi-screen CAS transaction screens. This may be used, for instance, when a claim is to be transferred to another office for completion or partial investigation. Transaction Logging captures and sends every screen of most CAS transactions to LOHC to print into hard copy in the event of system failure. If a daily system backup is run, the Transaction Logging data is deleted. A number of system and database reports are also printed which flow through the LOHC. Such reports include processing error reports, reassignment reports, overnight system reports, etc.

All the reports reflect a system generated creation date. The creation date is the date the report originally entered the print queue (loaded in LOHC). For On-Line reports, this is the date the information to produce the report was input. For Off-Line reports, this is the date following overnight processing.

All reports are stored in the LOHC facility until they ar printed. Once loaded to LOHC, they have a predetermined retention period. After the retention period, an automatic purge occurs and reports that have been sent but not printed will no longer be available.

A Status Option Menu (not shown) is used to select reports to be displayed. The reports are then displayed in accordance with the specific field requested (such as date, form number, group or report number). One or more fields can be entered in the Status Option Menu (e.g. entering a date and form number will display the status of all reports created on the specified date for printing on the specified paper, entering no date will default to all reports queued for that user). A Default Status screen, shown in Table XLIV, displays all reports in ascending order by group and secondarily, in descending order by date within the group. An operator can delete or print all sent or unsent pages of a report by positioning the cursor on the left side of the desired report and pressing the appropriate function key. In addition, an operator can change the printer destination, the number of copies or select specific pages to be printed by using the Print With Options menu shown in Table XLV.

TABLE XLIV

LOCAL OUTPUT HOLD CONTROL - DEFAULT        -SYS ADMIN

| GROUP | REPORT | (REPORT) | CREATED | FORM | TOTAL PAGES | PAGES SENT | PTR |
|---|---|---|---|---|---|---|---|
| HOSTHCPY | HHC LPT AUTO | (HCLPAUTO) | 06/29/89 | 000 | 0003 | 0000 | C |
| HOSTHCPY | HHC LPT AUTO | (HCLPAUTO) | 07/01/89 | 000 | 0002 | 0000 | C |
| HOSTHCPY | HHC LPT AUTO | (HCLPAUTO) | 07/02/89 | 000 | 0003 | 0000 | C |
| HOSTHCPY | HHC LPT AUTO | (HCLPAUTO) | 07/05/89 | 000 | 0002 | 0000 | C |
| HOSTHCPY | HHC LPT AUTO | (HCLPAUTO) | 07/06/89 | 000 | 0008 | 0000 | C |
| HOSTHCPY | HHC LPT AUTO | (HCLPAUTO) | 07/07/89 | 000 | 0002 | C | |
| HOSTHCPY | HHC LPTX WC | (HCLPWORK) | 07/02/89 | 000 | 0009 | C | |
| HOSTHCPY | HHC LPTX WC | (HCLPWORK) | 07/06/89 | 000 | 0008 | 0000 | C |
| HOSTHCPY | HHC LPTX WC | (HCLPWORK) | 07/07/89 | 000 | 0000 | C | |
| HOSTHCPY | HHC PAYMENTS | (HCPA    ) | 07/02/89 | 000 | 0004 | 0000 | C |
| HOSTHCPY | HHC PAYMENTS | (HCPA    ) | 07//7/89 | 000 | 0004 | 0000 | C |
| LOHC | SCTY BY RPT | (LOHCRPT ) | 07/01/89 | 000 | 0002 | C | |
| LOHC | SCTY BY USER | (LOHCUID ) | 07/01/89 | 000 | 0003 | C | |
| PRTTRANS | PTRS LPT AUT | (PTLPAUTO) | 06/29/89 | 000 | 0004 | 0000 | C |
| PRTTRANS | PTRS LPT AUT | (PTLPAUTO) | 07/02/89 | 000 | 0002 | 0000 | C |

| 5) NEXT | 6) REQUEUE | 13) PRINT ALL | 7) P-OPTIONS | 14) PRINT UNSENT |
|---|---|---|---|---|
| | 16) PREVIOUS | 8) DELETE | 15) PRINT SENT | 32) TOP MENU |

17. Payments

Payments are one end result of the processing of claims. The entire investigation (adjustment) process and the

TABLE XLV

LOCAL OUTPUT HOLD CONTROL

PRINT WITH OPTIONS MENU

| GROUP | REPORT | (REPORT) | CREATED | FORM | PAGES | SENT | PTR |
|---|---|---|---|---|---|---|---|
| TRXLOG | TRANS LOG PAYMENTS | TLPA | 07/09/87 | 000 | 0002 | 0000 | C |

NEW PRINTER: __

OF COPIES: ___

PRINT PAGE RANGE FROM ___ TO ___

| 13) PRINT ALL | 15) PRINT SENT | 16) PREVMENU | 32) TOP MENU |
|---|---|---|---|
| 14) PRINT UNSENT | | | | corresponding documentation is all to determine what, if any, payment is owed to a claimant. Payments can be repetitive (the same payment for a predetermined period of time), multiple and varying, or single sum. Each payment is treated slightly differently by the CAS system and processing varies depending on a claim's status (i.e. open or closed) at the time of the payment.

A different work flow occurs depending on the handler's selection of the type of payment transaction (i.e. close, partial, reopen/close) and the method of issue (i.e. machine, manual, repetitive). To choose a claim upon which a payment is to be made, a Claim List screen, shown in Table XLVI, is provided. This screen displays the claim family and is prefilled, listing the main claim number, followed by any companion claim numbers. Alternatively, a claim upon which payment is to be made, can be chosen through the Select Claim screen shown in Table XLVII.

Once the claim is chosen, a Payment Control screen, shown in Table XLVIII is accessed. This screen is used to advise the system of the type of payment, the method of issue, the check amount, the nature of the payment, the payee and the person to whom the check should be mailed. Additional information including the claim number and the authorizer's initial are prefilled from previously entered data. If the payment is to receive special handling (e.g. attachment required, return to requestor, etc.), it may be indicated on the Payment Control screen.

Manual and Machine Issue Payment screens are provided which are nearly identical. However, the Machine Issue screen does not include the policy number, check number and check digit fields found on the Manual Issue screen. The Payment-Machine Issue screen is shown in Table XLIX.

The Close-Reopen/Close Payment Transaction is used to record and/or issue a final check on a claim or to reopen a closed claim, issue a check and close the claim again. The close Payment Transaction screen from which this transaction is undertaken, is shown in Table L.

Frequently, partial payments are made on claims. These partial payments are used to compensate a claimant for only a verified portion of a claim. The Partial Payment Transaction screen is provided to record and/or issue partial payments on open claims. The claim number is prefilled on the screen which

TABLE XLVII
PAYMENT SELECT CLAIM SCREEN

ENTER CLAIM NUMBER __ _ ____

| ENTER) SELECT CLM | 16) HELP | 16) RETURN |
|---|---|---| is shown in Table LI.

When "repetitive" is selected in the 'Method of Issue' field of the Payment Control screen, the Payment-Machine Issue screen displays for completion. This is because all repetitive payments are machine issued. The Repetitive Payment Transaction screen is normally accessed following the completion of the Machine Issue and Partial Payment screens.

TABLE XLVI
PAYMENT LIST CLAIM SCREEN

PLEASE SELECT FROM THE LIST OF CLAIMS:

| KEY OFFICE CODE | CLAIM SYMBOL | NUMBER | WIP INDICATOR |
|---|---|---|---|
| _ 023 | K | AL | 00046 |
| _ 023 | _ | AC | 00047 |
| _ 023 | _ | AP | 00048 |
| _ 023 | _ | AP | 00049 |
| _ ___ | _ | ___ | _____ |
| _ ___ | _ | ___ | _____ |
| _ ___ | _ | ___ | _____ |

| ENTER) SELECT CLM | 4) PREV/FIRST | 18) HELP | 16) RETURN |
|---|---|---|---|
| | 5) NEXT/LAST | 23) LC | |

TABLE XLVIII
PAYMENT CONTROL SCREEN

CLM NUM: 027 K AP 00002                              AI: FRD

| TYPE OF PAYMENT: | CLOSE: | PARTIAL: | REOPEN/CLOSE: |
|---|---|---|---|
| METHOD OF ISSUE: | MACHINE: | MANUAL: | REPETITIVE: |

CHECK AMT:                        NATURE OF PAY:

PAYEE SAME AS:   INSD:   CLMT:   INSD/LOSS PAYEE:   DIR:   OTHER:

MAIL TO:            PAYEE:           AGENT:
IF OTHER ENTER:     NAME:
                    STREET:
                    CITY:            ST:        ZIP:

TABLE XLVIII-continued

HNDL ID:   LOCAL ONLY:

| ENTER) UPDATE | 18) HELP | 23) LC | 32) CANCEL |
|---|---|---|---|

A Repetitive Payment Schedule Information screen is used to advise the system of the number of repetitive payments, frequency of issuance (i.e. weekly, bi-weekly or monthly) and the date the payments will begin. The claim number, authorizer's initials, check amount and nature of payment will be prefilled on this screen, which is shown in Table LII.

A Repetitive Payment Schedule screen (not shown), which normally follows the Repetitive Payment Schedule Information screen, is prefilled when it displays. This screen lists the payments by their respective date of issue (automatically calculated form the information input through the Repetetive Payment Schedule Information screen) along with the nature of the payment. This schedule should be reviewed by the operator to confirm that the prefilled information is correct. If the schedule needs to be revised, screens for adding, deleting or modifying the repetitive payment schedule are available.

TABLE XLIX
PAYMENT - MANUAL ISSUE

AI:FRD

CLM NUM: 027 AP 00002   POL NUM: 02 MVP 110355   LOSS DATE: 06/13/88
INSD NAME: BROWN, JANE
CLMT NAME: GOVERNALI JOSEPH          CLMT STATUS:
CHECK NUM: 0000000000   ID:   IN LIEU CHK NUM: 00000

PAYEE NAME: GOVERNALI, JOSEPH

STREET: 16 CENTRAL AVENUE
      CITY: SYRACUSE    ST: NY    ZIP 13221

NATURE OF PAY: SETTLEMENT ON PROPERTY DAMAGE    ISSUE DATE: 07/18/89
CHECK AMOUNT: 527.55   TR CODE:                  PAYEE TIN:

NB:   AMT:
NB:   AMT:
NB:   AMT:
NB:   AMT:

| ENTER) UPDATE | 18) HELP | 30) LOCAL DATA | 16) RETURN |
|---|---|---|---|
| | 32) CANCEL | | 23) LC |

TABLE L
CLOSE PAYMENT TRANSACTION

CLM NUM: 027 AP 00002          DESTROY DATE:

DIS REG DATE:
    DIS IND DATE:

CLM ACTION CODE:
    SUIT RESULT CODE:
COLL SOURCE/TOTAL LOSS IND:

LOSS PAID:   _0.00
    ALLOC EXP PAID:   _0.00
     SUBRO EXP PAID:   _0.00
  SALVAGE EXP PAID:   _0.00
  REFUND EXP. PAID:   _0.00

TABLE L-continued

| ENTER) UPDATE | 18) HELP | 16) RETURN |
|---|---|---|
| 32) CANCEL | 23) LC | 30) LOCAL DATA |

A Payment-Route/Process screen is typically the final screen in a Payment Transaction. This screen is shown below in Table LIII. The Payment-Route/Process screen is used to "process" the Payment Transaction or to route the unprocessed payment transaction to another staff member (e.g. a supervisor) for review. When a payment transaction is "processed", the system is advised to accept the transaction and to proceed with the necessary steps to print the check. If a claim handler's authority is exceeded by the amount of the payment, it is necessary for a supervisor to review the payment transaction before it is processed. Thus, the routing of the unprocessed payment transaction to a supervisor insures that the necessary authority will be secured prior to the printing of the check. If a handler attempts to process a check for more than his authorized amount, an alert message is generated and the transaction is automatically routed to a supervisor. (The handler's authorization amount is obtained by interaction with the Staff Tables.)

TABLE LI
PARTIAL PAYMENT TRANSACTION

CLM NUM: 027 K AP 00002

DIS BEG DATE:
    DIS IND DATE:

CLM ACTION CODE:

TABLE LI-continued

| SUIT RESULT CODE: | | |
|---|---|---|
| COLL SOURCE/TOTAL LOSS IND: | | |

| ENTER) UPDATE | 18) HELP | 16) RETURN |
|---|---|---|
| 32) CANCEL | 23) LC | 30) LOCAL DATA |

18. Windowing

Incorporated into the present system is the capability to be logged on to more than one function or screen on a single terminal. This capability is called windowing. (In a preferred embodiment of the present invention this function is provided as a Wang ® utility, but it is available through many other vendors.)

Once an operator is logged on to the system, he can "window" to another screen on the same terminal. This is accomplished by pressing a combination of two keys at the same time. The combination of the 'Shift' key and the 'Next' key move the operator between the various windows.

TABLE LII
REPETITIVE PAYMENT SCHEDULE INFORMATION

CLM NUM: 027 C 40987  AI: FRD
CLM AMT: 200.00
NAT. OF PAYM: TEMPORARY COMPENSATION_____

NUMBER OF PAYMENTS: 00

FREQUENCY OF PAYMENTS:  M = MONTHLY
                         B = BI-WEEKLY
REPETITIVE PAYM START DATE:  M = MONTHLY

| ENTER) GEN REP PAYM SCHED | 18) HELP | 16) RETURN | 23) LC | 32) CANCEL |
|---|---|---|---|---|

The system treats each window as a separate terminal. As such, it is necessary to log on and log off every window in order to access and depart from the system. This function permits an operator to perform multiple transactions at the same time including: viewing the Directory Tables while inputting Text fields; answering a telephone inquiry while inputting notices of losses; and interfacing with the Host while performing any other function.

19. Mailboxes

Mailboxes are the equivalent of a "message waiting" function. "Alert" messages, Loss Processing Referrals, Payment

TABLE LIII
PAYMENT - ROUTE/PROCESS

CLM NUM: 027 AP 00002

ROUTE TO INITIALS:

PT:

TABLE LIII-continued

PTA:

NEXT TRANS:  DO:

| ENTER) ROUTE | 2) PROCESS | 3) CONTROL SCREEN |
|---|---|---|
| 18) HELP | 16) RETURN | 23) LC |

Referrals and Investigative Instructions are examples of information which will form a queue in a user's mailbox.

A Mailbox Menu screen, shown in Table LIV, provides the user with an indication of the types of messages waiting for him, if any (e.g. assignments, referrals or alerts). From this same menu he can access the various messages and display summary listings of assigned claims etc.

TABLE LIV
MAILBOX MENU

|  |  | MESSAGES WAITING |
|---|---|---|
| 1) | Assignment Mailbox | X |
| 2) | Referral Mailbox | X |
| 3) | Alert Message Mailbox | X |
| 4) | Wang Office |  |
| 16) | Return |  |

-OR-

Supply a new Trans Code and press ENTER: ___

The selection of the Assignment Mailbox accesses an Assignment Mailbox screen which shows claims that have been assigned to a claim handler. This screen, shown in Table LV, displays assignments, in summary form, in chronological order. Each assignment can be reviewed by the claim handler by positioning the cursor next to the assignment entry and pressing 'Enter'. When an assignment has been reviewed a 'Y' appears in a 'Reviewed' field which indicates that item can be deleted automatically at the end of the day by the system.

TABLE LV
ASSIGNMENT MAILBOX

TABLE LV-continued
for ABC

| TYPE REVIEWED | INSURED NAME DATE | TIME | CLAIM NUMBER | CLAIMANT NAME | ASSIGNED BY FMD |
|---|---|---|---|---|---|
| LPTX N | CRANE CONSTRUCTION CO. 12/09/87 | 11:06:05.36 | 023 C 00139 | BILL SMITH | |
| LPTX W | FRANK BROWN 12/14/87 | 08:57:48.61 | 023 AC 00193 | JIM JONES | RTS |

POSITION CURSOR IN FRONT OF ITEM TO BE REVIEWED AND PRESS ENTER

| 4) PREV/FIRST | 8) DELETE | 17) NT | |
|---|---|---|---|
| 5) NEXT/LAST | 11) CHANGE INITIALS | 23) LC | 16) RETURN |

A Referral Mailbox screen, shown in Table LVI, contains: payment referrals and LPT referrals (new LPTs, HTC Received, Add Companion and Local Only). These transactions appear in the above order and with each set of items corresponding to a particular transaction sorted in chronological order. As with assignments, each referral can be selectively reviewed. After review, the item entry will be deleted (unless the operator chooses to maintain the entry for additional review. This can be done by selecting the appropriate function key).

TABLE LVI
REFERRAL MAILBOX FOR ALB

| TYPE/ REVIEWED | INSURED NAME DATE | TIME | CLAIM NUMBER | CLAIMANT NAME | ROUTED BY |
|---|---|---|---|---|---|
| I INST | BUFFALO OIL COMPANY, INC 12/10/87 | 07:42:57.16 | 023 C 00053 | CHARLIE BROWN | PMA |
| I INST N | BRINKMAN CHEVROLET INC. 12/10/87 | 07:53:25.57 | 023 C 00054 | JOHN BLOCK | LRS |
| I INST N | BUFFALO OIL COMPANY INC. 12/11/87 | 15:33:41.59 | 023 C 00055 | | TPC |

POSITION CURSOR IN FRONT OF ITEM TO BE REVIEWED AND PRESS ENTER

| 4) PREV/FIRST | 9) SELECT TYPE | 17) NT | |
|---|---|---|---|
| 5) NEXT/LAST | 11) CHANGE INITIALS | 18) HELP | |
| 8) DELETE | | 23) LC | 16) RETURN |

An Alert Message Mailbox screen, shown in Table LVII, may also be accessed from the Mailbox Menu screen. This menu (mailbox) is only available to staff members who are in a supervisory position. This mailbox provides access to alerts which have been generated including: LPT Referral/Assignment Delay, Authority Level Exceeded and Diary and Staff Table Alert Messages.

TABLE LVII
ALERT MESSAGE MAILBOX FOR RDC

PRESS THE APPROPRIATE PF KEY AS LISTED BELOW

| | MESSAGES WAITING |
|---|---|
| 1) LPT REFERRAL/ASSIGNMENT DELAY | X |
| 2) AUTHORITY LEVEL EXCEEDED | X |
| 3) DIARY | X |

TABLE LVII-continued

| | |
|---|---|
| 4) CASE LOAD | |
| 5) STAFF TABLE | X |
| 6) INCOMPLETE FORMS | |
| 7) CHANGE INITIALS TO TFC | |
| 16) RETURN | |

-OR-

SUPPLY A NEW TRANS CODE AND PRESS ENTER:

NEXT TRANS: __

A provision also exists within the mailbox function to send intraoffice electronic mail (primarily administrative memos and the like). This function is preferably accessed through the "Wang Office" automation program which is available when Wang ® brand computers and peripherals are used throughout a claims office. This function is not, however, limited to Wang ® brand equipment. One of skill in the art would be able to provide such a feature using any comparable hardware.

20. The Diary Function

The ability to "diary" a claim which requires subsequent activity is an integral facet of the loss adjustment process. The diary is a personal diary, determined by the operator's User ID. It has the capability to record a specified date for action on a claim, to display that claim at the appropriate time and to "rediary" as needed. When an LPT is processed, the system automatically sets the diary date for the supervisor according to Staff Table parameters. This date is predetermined based on the type of claim and the experience level of the handler but can be overridden if necessary.

The diary, is formatted by staff member, for each day of the year on which a claim has been placed on the diary. A Diary Listing screen, shown in Table LVIII, displays all claims diaried for a specified day. The date displayed defaults to the current date, but future diary dates can also be accessed.

TABLE LVIII

DIARY LISTING
DATE: 03/20/89  STAFF: LAE  COUNT: 1

| INSURED NAME | CLAIM NUMBER | BY |
|---|---|---|
| CLAIMANT NAME | LOSS DATE | REASON |
| FILE | 023  AC 0001 | LAE |
| SMITH, JOHN | 02/02/89 | FILE |

SUPPLY A TRANS CODE AND PRESS RETURN
NEXT TRANS:    DATA CARRY:

The diary history, displayed on a Diary History screen (not shown) lists all dates set by a supervisor for a particular claim (past, present and future). The diary history is primarily used as a quality control review by management.

A Diary Function screen, shown in Table LIX, permits: diary creation; deletion; rediary; alternate diary; and access to a diary history. The Diary Function screen can be used to display all dates diaried for a particular claim in chronological order. A record is maintained for any claim for which at least one diary date existed.

Diary dates may be set by any Staff member for a particular claim. However, only the initial supervisor diary dates are set automatically. For instance, a claim handler may wish to set personal diary dates to remind him to do certain things. In such cases, it is usually helpful to provide comments with the diary date. Comments are entered through the Activity Log function and are accessible when the diary date(s) is displayed.

generated when the maximum number of diary entries allowed for an individual on a per day basis (set through the Staff Tables) has been exceeded, when a handler allows his diary to "roll over" more than a set number of claims (diary dates automatically "roll over" to the next day when they are not accessed or acted upon by the handler), when an attempt is made to diary a day that has been identified as a vacation or non-working day (set through the Staff Tables), or when an attempt is made to diary a date that is more than six months in the future.

21. Ad Hoc Reporting

The Ad Hoc Reporting function is a standard software database query. It is used to extract any local database information which is desired. As with most software database queries the output from the extraction can be arranged in any manner.

A number of preformatted reports or queries are available to all claims offices. These include: Duplicate Payment Reports, Claim Handler Outstanding Claim Reports and Activity Log Disaster Recovery reports. An example of a custom local claims office report is a Weekly Claim Input Summary. This report totals the number of claims input for a given week. It can be done office wide and/or by line of business. Essentially, the Ad Hoc Reporting function can extract and format any system database information into a report.

22. Local Data

The Local Data function provides an individual claim office with the ability to define and record local specific data through generic definitions maintained by the CAS system. It permits a local claims office to name the input elements (prompts) as they wish them to appear on a screen and to capture these elements at logical points within the CAS system workflow.

A Local Data Label Maintenance screen (not shown) is provided which functions as a menu to permit an operator (usually a supervisor with a very high security level) to choose specific input fields (i.e. policy, claimant, claim or payment information) to establish. By way of example, a Local Claim Information Labels screen is shown in Table LX. This screen permits the operator to choose screen labels for preformatted generic input fields. The preformatted generic input fields include a

TABLE LIX

DIARY FUNCTION

CLAIM NUMBER: 023   C   00002
INSURED NAME: STRADLIN, IZZY
CLAIMANT NAME: BAILEY, BILL
LOSS DATE: 03/03/89         HAND.: RDC         SUPV.: ALB

| DIARY DATE | BY | REASON FOR | REQUEST | JOB FILE | DESCRIPTION |
|---|---|---|---|---|---|
| 03/15/89 | LAE | | FILE | | OUTSIDE CLAIM REP |
| 05/02/89 | RJM | | ACTL | | INSIDE CLAIM REP |

| 4) PREV/FIRST | 6) ADD | 8) DELETE | 14) ACTIVITY LOG | 17) NT |
|---|---|---|---|---|
| 16) RETURN | 5) NEXT/LAST | 7) SELECT | 15) DIARY LISTING | 18) HELP |
| 23) LC | 11) HISTORY | 22) FAMILY REDIARY | | |

ENTER TO CONFIRM OR PF 1 TO RE-SELECT.                    20020

Diary alert messages, mentioned above, are returned to the operator's screen as well as being routed to a supervisor's message queue (mailbox). Such alerts are number of 10 byte numeric fields, 2 byte character fields, 30 byte character fields and 6 byte date fields.

TABLE LX
LOCAL CLAIM INFORMATION SCREEN LABELS

| | | | |
|---|---|---|---|
| N1: TT EST INC LOSS | (NUMBER 10) | C11: MISC (1 THRU 6) PAID | (CHAR 30) |
| N2: TP PAID | (NUMBER 10) | C12: CLMT'S ATTY EST INC | (CHAR 30) |
| N3: TP EST INC LOSS | (NUMBER 10) | C13: CLMT'S ATTY PAID | (CHAR 30) |
| N4: TP PAID | (NUMBER 10) | C14: RECOVERY AMOUNT | (CHAR 30) |
| N5: MEDICAL PD | (NUMBER 10) | | |
| N6: HOSPITAL PAID | (NUMBER 10) | | |
| C1: | (CHAR 2) | D1: DATE CLMT 1ST CONTAC | (DATE) |
| C2: | (CHAR 2) | D2: DATE 1ST COMP PAYMENT | (DATE) |
| C3: | (CHAR 2) | D3: DATE COMP STOP/SUSP | (DATE) |
| C4: | (CHAR 2) | D4: | (DATE) |
| C5: | (CHAR 2) | D5: | (DATE) |
| C6: | (CHAR 2) | D6: | (DATE) |
| C8: DRUGS PAID | (CHAR 30) | | |
| C9: MED TRANS. PAID | (CHAR 30) | (LABEL PREFIX = LL3) | |
| 10: MEDICAL EST INC | (CHAR 30) | (DATA PREFIX = LLC) | |

9) MODIFY  16) RETURN

Once the desired number of generic input fields have been given specific labels (not all the generic fields have to be used) they are arranged into an input format on a Local Claim Information screen such as that shown in Table LXI.

TABLE LXI
LOCAL CLAIM INFORMATION

INSD: WARNER LANDSCAPING  POL NO: 02 WB 125487
CLMT: GROAN, JIM  CLAIM NUMBER: C 0000

| | | | |
|---|---|---|---|
| TT EST INC LOSS | 5,000 | TT PAID | 0 |
| TT EST INC LOSS | 0 | TP PAID | 0 |
| MEDICAL (PHYS FEE) PD | 0 | HOSPITAL PAID | 0 |

DRUGS PAID  _____
MED TRANSPORTN PAID  _____
MEDICAL EST INC LOSS  3500
MISC (1 THRU 6) PAID  _____
CLMT'S ATTY EST INC  _____
CLMT'S ATTY PAID  _____
RECOVERY AMOUNT  _____

DATE CLMT 1ST CONTACT  03/09/89  DATE 1ST COMP PAYMENT ____
DATE COMP STOP/SUSP  _____

ENTER) MODIFY  8) DELETE  23) LC  16) RETURN

Information input through the Local Information screen(s) is maintained on local databases only. It is not communicated to the Host. The purpose of this function is to capture data necessary to comply with local filing requirements and other specific local needs. Other dedicated functions, enumerated above, are designed to capture information transferred to and used by the Host.

23. Work Management System

As indicated previously the present invention is a system and method for substantially automating work management. While reference has been made to a claim processing system, numerous other applications will occur to those of skill in the art.

In another preferred embodiment of the present invention, the work activities of attorneys in a law office are managed through the present system and method.

The Initial Input Transaction (equivalent to the LPT) generically provides a facility for recording case specific information. In a law office, each case that is received is recorded through the Initial Input Transaction (IIT). The matter name and type as well as the expected cost, etc. are input through the IIT. By way of example, for a trademark application, the particular trademark, its goods and the date of first use are all recorded through the IIT.

The Work Source Index (equivalent to the Policy Index) generically provides an accessible database of work source information. In a law office, the Work Source Index (WSI) is maintained as a client database. Thus, when an IIT is input for an existing client, the basic client information is extracted from the WSI and prefills some of the IIT fields. This is done by inputting the client number through a WSI screen.

The Staff Table function generically provides a facility for storing information relevant to office personnel. Specifically, in a law office, the Staff Tables are used to maintain authority levels for access to certain functions (e.g. billing, docketing, etc.), to track vacation schedules, to indicate experience levels, to indicate billing rate, to indicate areas of expertise, to record Patent Office registration numbers, to set overall caseload limits and daily diary or due date limits, to indicate a supervising attorney, etc.

The Diary function generically provides a means for prioritizing work and for scheduling various tasks. In a law office, the diary is used to docket legal due dates, to schedule daily meetings, to set business deadlines and to maintain and report certain attorney specific date information (e.g. the meeting of business deadlines, the number of times diary entries rollover, the number of events diaried for a single day or time period, etc.).

The Activity Log function generically maintains a record of key activities involved in the processing of work items. In a law office the Activity Log is a very important tool for tracking activity on a case and activity undertaken for a particular client. In practice the Log can be employed on two separate levels. The first level permits simply the tracking of important activities which occur in handling a case (e.g. the receipt of an Office Action, a telephone conference with an Examiner, the mailing of an amendment, etc.). On the second level, the Log is used to track attorney billing. In such cases an attorney accesses the log for a particular client and the specific matter and inputs a description of the work done and the time spent. This information is then directly fed into an automatic billing function (corresponding to the CAS payment function).

The generation of Alert Messages generically provides for the routing of such messages automatically to appropriate staff members upon the breach of some predetermined criteria. In a law office, such messages are provided when too much time is spent on a case, when deadlines are missed, when system security locks out an attempted entry, when a deadline is assigned during a scheduled vacation, etc.

The Mailbox function generically provides a facility for referring work tasks and receiving alert messages. In a law office cases are assigned with notification placed in attorneys' mailboxes. The cases, and work generated thereon (e.g. a brief, a patent application, etc.), are also routed for review and revision to other attorneys.

The Caseload Monitoring function generically provides a facility to track and report the workload of the staff. In a law office each attorney's caseload is monitored to insure even distribution. Further, with this function it is possible to monitor an attorney's progress on specific types of cases.

The Reassignment function generically provides a facility to move work from one staff member to another. In a law office one or more cases can be easily reassigned to another attorney. The need for reassignment frequently occurs when an attorney leaves or when a case evolves to a point where a higher level of expertise is needed.

Automated numbering is of particular value in a law office. Each case must be identified with a client and matter numbers for easy reference. As such, the system provides such numbers automatically without worry of duplication. Moreover, with the present system and method there is no need to re-record the numbers for billing purposes.

Text Processing generically provides for the generation of preformatted form letters. It includes system controlled extraction of applicable information from local databases to prefill blank fields, automatic Activity Log recording and paper type and copy management. In a law office Text processing is used to automatically generate forms for legal filings (e.g. declarations, powers of attorney, etc.), letters (reporting letters and the like) and billing statements. The openings and closings of letters, as well as the openings and closings of trademark/patent applications and amendments are also automatically generated. The intervening text is input as with any other word processing package.

The Directory Tables function generically provides a facility for storing names, addresses and other pertinent information of individuals/services. In a law office the Directory Tables function is used to maintain clients' names and addresses as well as the names and addresses of courts, process servers, expert witnesses court reporters, etc.

The Info Search function generically provides a facility to search for information resident on local databases. In a law office the Info Search function is used to quickly provide clients with status reports without attorney intervention, to locate case numbers, to determine time billed to a case, etc.

The Local Data function generically provides a facility for customization of data recordation and output at the local level. In a law office the local data function is used for a variety of things including statistical tracking of client locations, categories of work, etc. However, local data can be used for virtually any database management needs.

The Help function, the Print Queue Management functions, the Data Carry facility and the various Change functions (e.g. Control Change, Element Change, etc.) all perform the same tasks in generic and law office environments. These functions all augment the use of the specific work processing functions.

While reference has been made to specific hardware, software and functional elements, these are meant as illustrative only and one of skill in the art may alter such elements without departing from the spirit and intent of the present invention.

What is claimed is:

1. A work management system comprising: processing means, including a data bank into which data is written and from which data is read, said data bank storing information regarding an initial transaction, work source information, office staff information, policy information, information regarding dates of importance, in formation regarding work processing activities, staff case load information, and predetermined text data for preparing documents, the data bank including staff table means for storing, retrieving, displaying and modifying information about staff members who access the system, wherein said stored information includes: name, user ID, job title, supervisor, experience level, cost rate, diary rollover limit, scheduled vacation, payment authority, and staff functional and processing authority levels; at least one terminal means for communicating with said processing means and operable by at least one operator to produce requests and to enter information and/or retrieve information for writing and/or reading from said data bank; display means for displaying information that is entered and retrieved; first merging means operatively interacting with said processing means for reading out from said data bank selected information regarding work processing activities and selected office staff information and merging said read out work processing activities information and said read out office staff information to compile an activity log listing key work activities and a staff member associated with those activities; case summary means for automatically summarizing said initial transaction information; routing means for routing transaction information to a staff member for processing in response to input through one of said terminal means; and staff member electronic mailbox means for receiving said initial transaction summary and other electronic messages; assignment means for assigning a case to a particular staff member for processing in response to input through one of said terminal means; reassignment means for reassigning cases from a particular staff member to another staff member for processing, diary means for automatically and manually setting, storing and displaying dates for various activities associated with the processing of a case including means for manually overriding automatically set diary dates; activity log means for automatically recording information about transactions undertaken through the system in the processing of a case and for manually recording information and comments about other activities in the processing of a case including means for selectively displaying said recorded information and comments on said display means; inquiry means for selectively retrieving and displaying transaction information in response to input of at least one case number through one of said terminal means; system controller means for controlling an operator's movements within the system, wherein said system controller means verifies the availability of each requested function during a system session and verifies said operator's authority to access a system function prior to permitting such access; and security means comprising security level means for selectively limiting access to certain predetermined functions of the system in accordance with a preset security level associated with each authorization code.

2. A system according to claim 1, further comprising second merging means operatively interacting with said processing means for reaching out from said data bank selected information and predetermined text data and merging said read out information and said read out text data to compile final documents tailored to a case; and print means coupled to said processing means for printing said documents.

3. A system according to claim 2, further comprising directory means for selectively storing, retrieving and displaying information relating to individuals to be contacted during work processing.

4. A system according to claim 3, wherein information stored by said directory means is automatically selected by category and displayed if said second merge means is unable to compile a final document because of missing information.

5. A system according to claim 1, further comprising mailbox view means for displaying electronic messages on said display means.

6. A system according to claim 1, further comprising alert means for automatically generating and routing an alert message to a first staff member's electronic mailbox means when a predetermined criterion is breached by an operator.

7. A system according to claim 1, further comprising electronic mail means for creating and sending messages from one terminal means to another.

8. A system according to claim 1, further comprising search means for locating a case file which resulted from the input of said initial transaction information, wherein said search means requires input of at least one of the following:
a) a customer number;
b) a case number;
c) an customer's complete last name;
d) part of a customer's last name;
e) the phonetic equivalent of a customer's last name; or
f) date of initial transaction.

9. A system according to claim 1, further comprising interactive, online help means for providing assistance in using the work processing system.

10. A system according to claim 1, further comprising status change means for electronically reopening, partially reopening or closing the processing of a case.

11. A system according to claim 1, further comprising automatic numbering means to automatically assign a number to each new case for which processing is undertaken.

12. A system according to claim 1, further comprising security means for limiting access to the system to only those individuals with preselected authorization codes.

13. A system according to claim 1, further comprising windowing means for accessing and processing a plurality of different cases simultaneously at one terminal means.

14. A system according to claim 1, further comprising print queue management means for controlling the printing priority of documents.

15. A system according to claim 1, wherein said data bank stores information regarding customers.

16. A system according to claim 15, further comprising second merging means operatively interacting with said first processing means for reading out from said data bank initial transaction information and reading out customer information and merging said read out initial transaction information and said read out customer information to compile an individualized work processing record for each case to be processed.

17. A system according to claim 1, further comprising modification means for altering said information regarding an initial transaction after said information has been stored in said data bank.

18. A system according to claim 1, wherein said information regarding an initial transaction is electronically transmitted to said first processing means from a remote location and stored in said data bank.

19. A system according to claim 1, further comprising text processing means for creating, displaying, modifying and storing customized documents having at least one blank input field, wherein said blank input fields are coded for use by said second merging means to merge said read out information and customized document data in accordance with said blank input field codes to compile final documents.

20. A system according to claim 19, wherein said compiled final documents are transmitted to print queue means to permit review of said compiled documents and their characteristics prior to printing.

21. A system according to claim 1, further comprising report means for generating and formatting reports based on information stored on said data bank, wherein said reports may comprise sums, summaries and lists of any of said information stored on said data bank and may be formatted in any preferred manner.

22. A system according to claim 1, further comprising: a plurality of generic field generators for receiving alphanumeric, numeric and date input information produced at a terminal means and storing said input information for said generic fields locally in said data bank; label creation means for creating and assigning text labels to said generic fields; and programming means for arranging at least some of said generic fields into at least one specialized input screen for display at said terminal means.

* * * * *